US012627810B2

(12) United States Patent
Li et al.

(10) Patent No.: US 12,627,810 B2
(45) Date of Patent: May 12, 2026

(54) MOTION VECTOR PREDICTION WITH DERIVED MOTION TRAJECTORY

(71) Applicant: GOOGLE LLC, Mountain View, CA (US)

(72) Inventors: Bohan Li, Santa Clara, CA (US); Jingning Han, Santa Clara, CA (US); Debargha Mukherjee, Cupertino, CA (US); Yaowu Xu, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/962,399

(22) Filed: Nov. 27, 2024

(65) Prior Publication Data

US 2025/0184497 A1 Jun. 5, 2025

Related U.S. Application Data

(60) Provisional application No. 63/604,389, filed on Nov. 30, 2023.

(51) Int. Cl.
H04N 19/139 (2014.01)
H04N 19/105 (2014.01)
H04N 19/176 (2014.01)

(52) U.S. Cl.
CPC ......... H04N 19/139 (2014.11); H04N 19/105 (2014.11); H04N 19/176 (2014.11)

(58) Field of Classification Search
CPC .. H04N 19/139; H04N 19/105; H04N 19/176; H04N 19/52

(Continued)

(56) References Cited

U.S. PATENT DOCUMENTS 9,888,255 B1 * 2/2018 Kokaram ............. H04N 19/577
2014/0328400 A1 * 11/2014 Puri ..................... H04N 19/119
375/240.16

(Continued)

FOREIGN PATENT DOCUMENTS

WO WO-2022101018 A1 * 5/2022 ........... H04N 19/533

OTHER PUBLICATIONS

Li et al., An Adaptive Linear Estimator Based Approach to Bi-Directional Motion Compensated Prediction, ICASSP 2020—2020 IEEE International Conference on Acoustics, Speech and Signal Processing (ICASSP), Barcelona, Spain, 2020, pp. 2038-2042 (Year: 2020).*

*Primary Examiner* — Marnie A Matt

(74) *Attorney, Agent, or Firm* — Young Basile Hanlon & MacFarlane, P.C.

(57) ABSTRACT

Decoding using motion vector prediction with derived motion trajectory includes obtaining, from previously reconstructed reference frames available for reconstructing a current frame, reference frame motion fields data for reconstructing the current frame, obtaining, using the reference frame motion fields data, trajectory mapping data for reconstructing the current frame, accessing, from the encoded bitstream, current encoded block data for a current block of the current frame; obtaining a motion vector prediction for the current block in accordance with the trajectory mapping data, obtaining a differential motion vector from the current encoded block data, obtaining a motion vector for the current block by adding the motion vector prediction and the differential motion vector, decoding the current block using the motion vector to obtain decoded block data for the current block, and obtaining reconstructed frame data for the current frame using the decoded block data.

20 Claims, 14 Drawing Sheets

(58) Field of Classification Search
USPC .................................................... 375/240.02
See application file for complete search history.

(56)                     References Cited

U.S. PATENT DOCUMENTS

| | | | |
|---|---|---|---|
| 2019/0014342 A1* | 1/2019 | Li | H04N 19/55 |
| 2019/0238879 A1* | 8/2019 | Han | H04N 19/433 |
| 2021/0144364 A1* | 5/2021 | Li | H04N 19/105 |
| 2021/0266588 A1* | 8/2021 | Liu | H04N 19/157 |
| 2022/0210462 A1* | 6/2022 | Luo | H04N 19/52 |
| 2023/0388529 A1* | 11/2023 | Gao | H04N 19/523 |
| 2024/0073438 A1* | 2/2024 | Wu | H04N 19/513 |
| 2024/0205448 A1* | 6/2024 | Chuang | H04N 19/105 |
| 2024/0223796 A1* | 7/2024 | Mukherjee | H04N 19/184 |

* cited by examiner

1200

1210
OBTAIN FIRST PREVIOUSLY DECODED REFERENCE FRAME (R0)

1220
OBTAIN CURRENT PREVIOUSLY DECODED BLOCK DATA

1222
INTER-CODED?

NO
1224

YES

1230
OBTAIN PREVIOUSLY DECODED MOTION VECTOR(S)

1240
EVALUATE, ENQUEUE

UNAVAILABLE

1250
DEQUEUE

1252

1260
OBTAIN PREVIOUSLY DECODED DATA

1262
INTER-CODED DATA AVAILABLE?

NO
1264

YES

1270
OBTAIN PREVIOUSLY DECODED MOTION VECTOR(S)

1272

1280
CURVE FITTING

1282

MOTION VECTOR PREDICTION WITH DERIVED MOTION TRAJECTORY

CROSS-REFERENCE TO RELATED APPLICATION(S)

This application claims priority to and the benefit of U.S. Provisional Application Patent Ser. No. 63/604,389, filed Nov. 30, 2023, the entire disclosure of which is hereby incorporated by reference.

BACKGROUND

Digital images and video can be used, for example, on the internet, for remote business meetings via video conferencing, high-definition video entertainment, video advertisements, or sharing of user-generated content. Due to the large amount of data involved in transferring and processing image and video data, high-performance compression may be advantageous for transmission and storage. Accordingly, it would be advantageous to provide high-resolution image and video transmitted over communications channels having limited bandwidth.

SUMMARY

This application relates to encoding and decoding of image data, video stream data, or both for transmission, storage, or both. Disclosed herein are aspects of systems, methods, and apparatuses for encoding and decoding using motion vector prediction with derived motion trajectory.

Variations in these and other aspects will be described in additional detail hereafter.

An aspect is a method for decoding using motion vector prediction with derived motion trajectory. Decoding using motion vector prediction with derived motion trajectory includes generating reconstructed video data by decoding an encoded bitstream and outputting the reconstructed video data. Decoding the encoded bitstream includes obtaining, from previously reconstructed reference frames available for reconstructing a current frame, reference frame motion fields data for reconstructing the current frame, obtaining, using the reference frame motion fields data, trajectory mapping data for reconstructing the current frame, accessing, from the encoded bitstream, current encoded block data for a current block of the current frame, obtaining a motion vector prediction for the current block in accordance with the trajectory mapping data, obtaining a differential motion vector from the current encoded block data, obtaining a motion vector for the current block by adding the motion vector prediction and the differential motion vector, decoding the current block using the motion vector to obtain decoded block data for the current block, obtaining reconstructed frame data for the current frame using the decoded block data, and including the reconstructed frame data in the reconstructed video data.

An aspect is a method for encoding using motion vector prediction with derived motion trajectory. Encoding using motion vector prediction with derived motion trajectory includes generating an encoded bitstream by encoding a current frame from an input video stream and outputting the encoded bitstream. Encoding the current frame includes obtaining, from previously reconstructed reference frames available for encoding the current frame, reference frame motion fields data for encoding the current frame, obtaining, using the reference frame motion fields data, trajectory mapping data for encoding the current frame, obtaining a motion vector prediction for a current block from the current frame in accordance with the trajectory mapping data, obtaining current encoded block data by encoding a current block of the current frame using a current motion vector, obtaining, as a differential motion vector, a result of subtracting the motion vector prediction from the current motion vector, and including, in the encoded bitstream, current encoded block data for the current block, wherein the current encoded block data for the current block includes the differential motion vector.

An aspect is an apparatus for encoding using motion vector prediction with derived motion trajectory. The apparatus includes a non-transitory computer readable medium, and a processor configured to execute instructions stored on the non-transitory computer readable medium to generate the encoded bitstream, wherein, to generate the encoded bitstream, the processor executes the instructions to encode a current frame from an input video stream and output the encoded bitstream. To encode the current frame the processor executes the instructions to obtain, from previously reconstructed reference frames available for encoding the current frame, reference frame motion fields data for encoding the current frame, obtain, using the reference frame motion fields data, trajectory mapping data for encoding the current frame, obtain a motion vector prediction for a current block from the current frame in accordance with the trajectory mapping data, obtain current encoded block data, wherein to obtain current encoded block data, the processor executes the instructions to encode a current block of the current frame using a current motion vector, obtain, as a differential motion vector, a result of subtracting the motion vector prediction from the current motion vector, and include, in the encoded bitstream, current encoded block data for the current block, wherein the current encoded block data for the current block includes the differential motion vector.

An aspect is an apparatus for decoding using motion vector prediction with derived motion trajectory. The apparatus includes a non-transitory computer readable medium, and a processor configured to execute instructions stored on the non-transitory computer readable medium to generate reconstructed video data, wherein, to generate the reconstructed video data, the processor executes the instructions to decode an encoded bitstream and output the reconstructed video data. To decode the encoded bitstream, the processor executes the instructions to obtain, from previously reconstructed reference frames available for reconstructing a current frame, reference frame motion fields data for reconstructing the current frame, obtaining, using the reference frame motion fields data, trajectory mapping data for reconstructing the current frame, access, from the encoded bitstream, current encoded block data for a current block of the current frame, obtain a motion vector prediction for the current block in accordance with the trajectory mapping data, obtain a differential motion vector from the current encoded block data, obtain, as a motion vector for the current block, a sum of the motion vector prediction and the differential motion vector, decode the current block in accordance with the motion vector to obtain decoded block data for the current block, obtain reconstructed frame data for the current frame in accordance with the decoded block data, and include the reconstructed frame data in the reconstructed video data.

BRIEF DESCRIPTION OF THE DRAWINGS

The description herein makes reference to the accompanying drawings wherein like reference numerals refer to like parts throughout the several views unless otherwise noted or otherwise clear from context.

DETAILED DESCRIPTION

Image and video compression schemes may include breaking an image, or frame, into smaller portions, such as blocks, and generating an output bitstream using techniques to minimize the bandwidth utilization of the information included for each block in the output. In some implementations, the information included for each block in the output may be limited by reducing spatial redundancy, reducing temporal redundancy, or a combination thereof. For example, temporal or spatial redundancies may be reduced by predicting a frame, or a portion thereof, based on information available to both the encoder and decoder, and including information representing a difference, or residual, between the predicted frame and the original frame in the encoded bitstream. The residual information may be further compressed by transforming the residual information into transform coefficients (e.g., energy compaction), quantizing the transform coefficients, and entropy coding the quantized transform coefficients. Other coding information, such as motion information, may be included in the encoded bitstream, which may include transmitting differential information based on predictions of the encoding information, which may be entropy coded to further reduce the corresponding bandwidth utilization. An encoded bitstream can be decoded to reconstruct the blocks and the source images from the limited information. In some implementations, the accuracy, efficiency, or both, of coding a block using either inter-prediction or intra-prediction may be limited.

Block-based hybrid video coding techniques, or codecs, to improve coding efficiency, encode motion vectors differentially based on linear motion vector prediction, which may inaccurately, or inefficiently, represent non-linear motion.

The encoding and decoding using motion vector prediction with derived motion trajectory described herein improves on video coding techniques, or codecs, by obtaining motion trajectory data based on available reference frames more accurately representing non-linear motion and obtaining motion vector predictions using the motion trajectory data.

Figure 1:
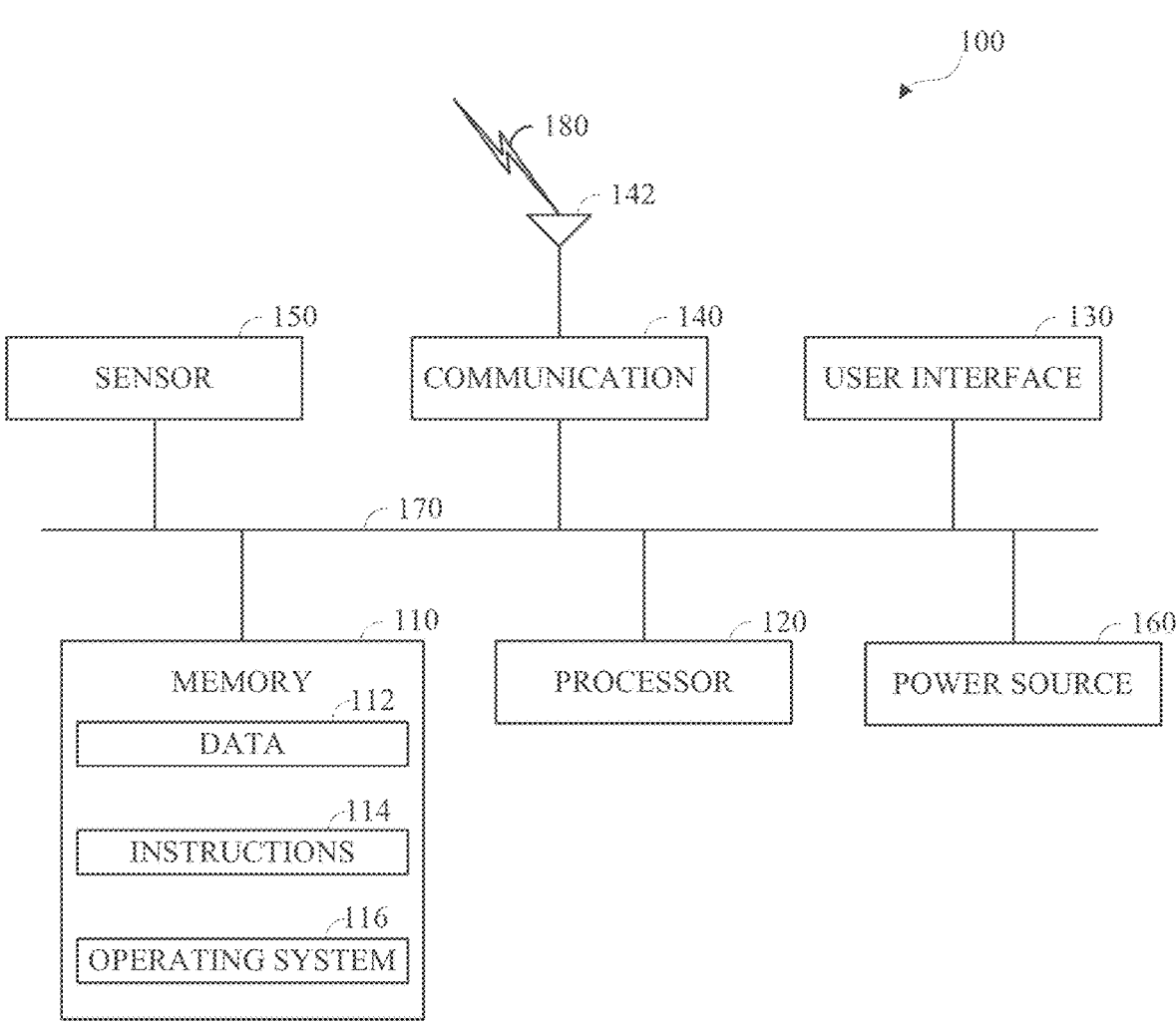
FIG. 1 is a diagram of a computing device in accordance with implementations of this disclosure.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio data, encoded audio data, decoded audio data, or the like. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, which may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, 100 the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can sense an image such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
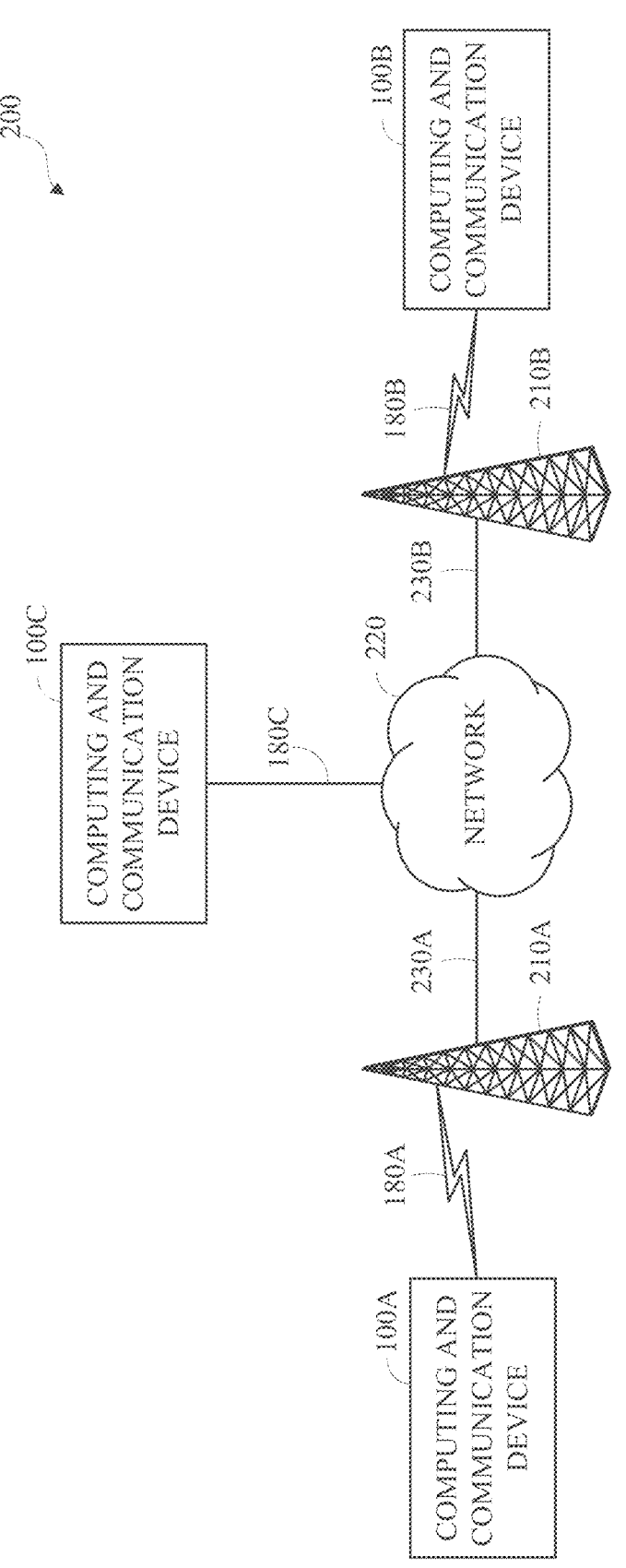
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some, or all, of the functions of a user device, or some or all of the functions of a server and a user device. For example, the server computing and communication device 100C may receive, encode, process, store, transmit, or a combination thereof audio data and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VOIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the HyperText Transport Protocol (HTTP), or a combination thereof.

The computing and communication devices 100A, 100B, 100C can communicate with each other via the network 220 using one or more a wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
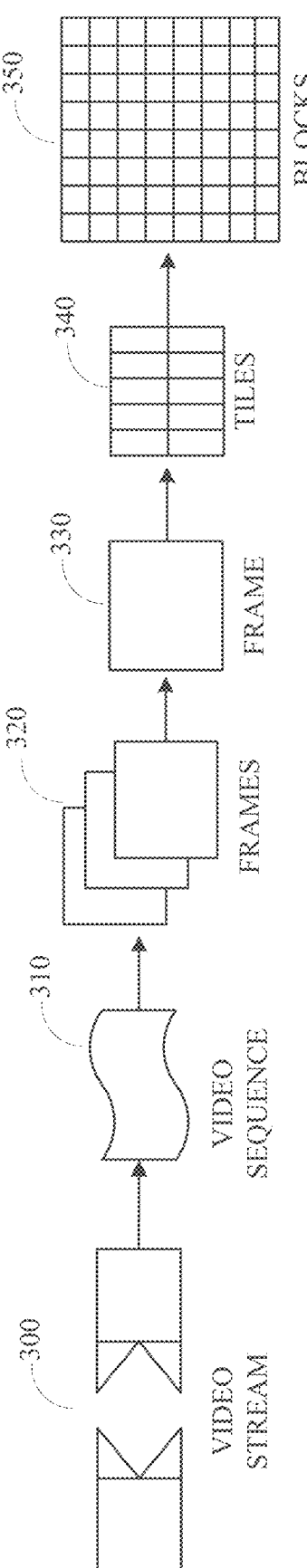
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include one or more tiles 340. Each of the tiles 340 may be a rectangular region of the frame that can be coded independently. Each of the tiles 340 may include respective blocks 350. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
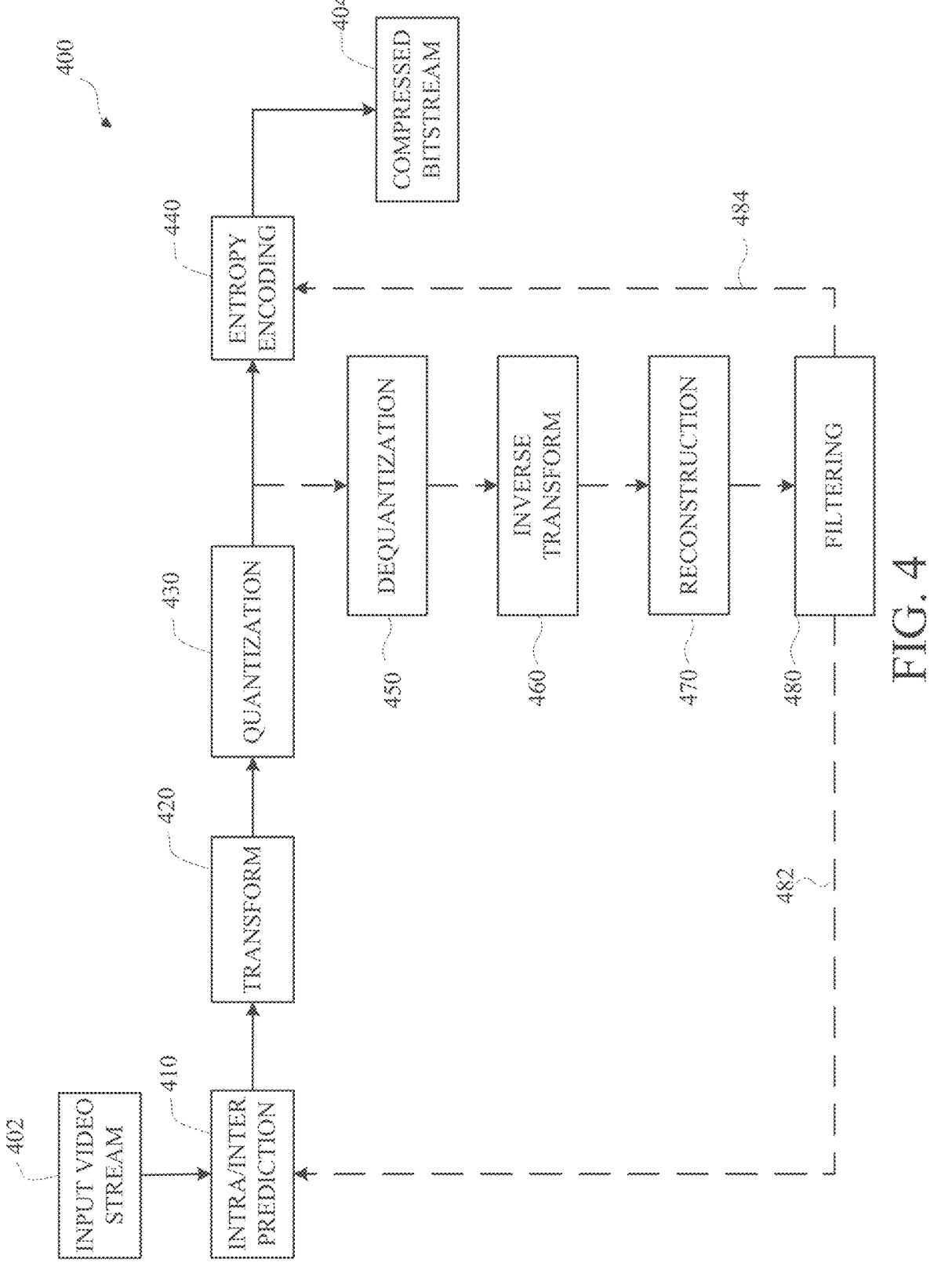
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e., DC (direct current)) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
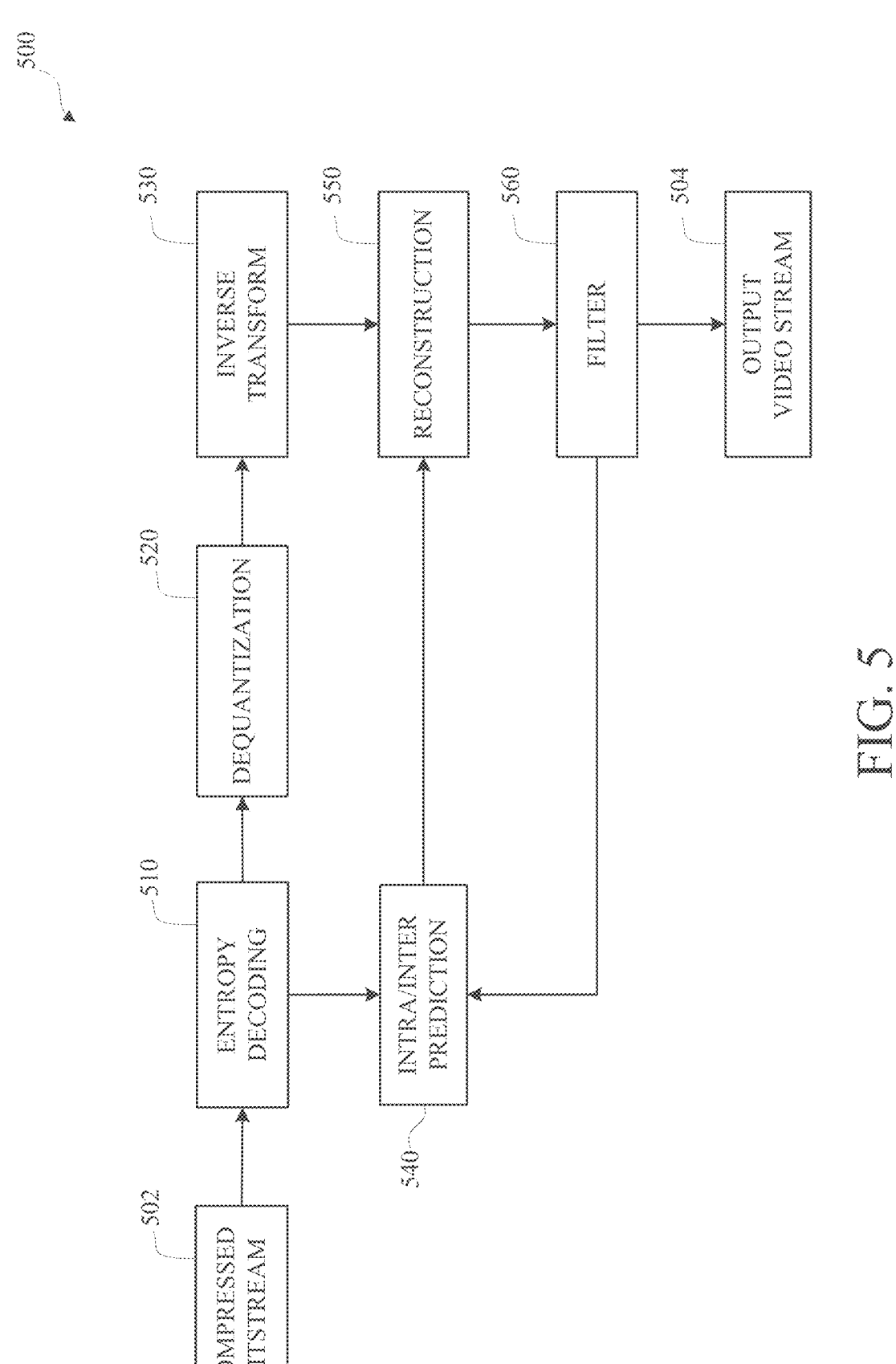
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform-based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without the filtering unit 560.

Figure 6:
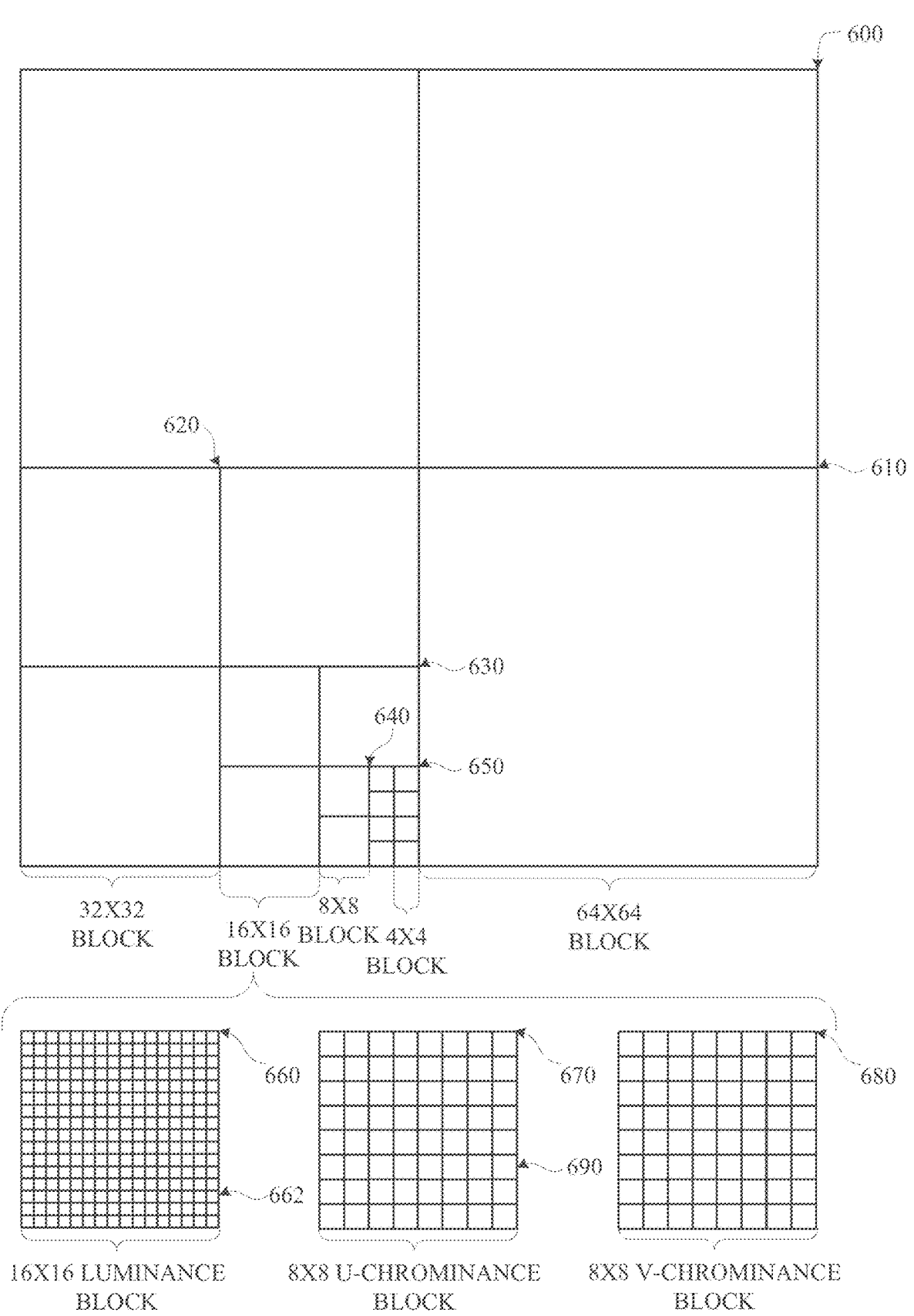
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16-pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a portion of a reference frame that corresponds to a current block or pixel of a current frame. For example, a reference frame, or a portion of a reference frame, which may be stored in memory, may be searched to identify a portion for generating a prediction to use for encoding a current block or pixel of the current frame with maximal efficiency. For example, the search may identify a portion of the reference frame for which the difference in pixel values between the current block and a prediction block generated based on the portion of the reference frame is minimized and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a prediction may include calculating a cost function, such as a sum of absolute differences (SAD), between the pixels of portions of the search area and the pixels of the current block.

In some implementations, the spatial difference between the location of the portion of the reference frame for generating a prediction in the reference frame and the current block in the current frame may be represented as a motion vector. The difference in pixel values between the prediction block and the current block may be referred to as differential data, residual data, a prediction error, or as a residual block. In some implementations, generating motion vectors may be referred to as motion estimation, and a pixel of a current block may be indicated based on location using Cartesian coordinates as $f_{x, y}$. Similarly, a pixel of the search area of the reference frame may be indicated based on location using Cartesian coordinates as $r_{x, y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block-based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit may include rectangular size prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning may include a full prediction partition search, which may include selecting a prediction partitioning scheme by encoding the coding unit using each available candidate prediction partitioning scheme and selecting the best scheme, such as the scheme that produces the least rate-distortion error.

In some implementations, encoding a video frame may include identifying a prediction partitioning scheme for encoding a current block, such as block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620 the 16×16 blocks 630, or the 8×8 blocks 640, as shown, and may include determining whether to partition into one or more smaller prediction partitions. For example, a 64×64 block may be partitioned into four 32×32 prediction partitions. Three of the four 32×32 prediction partitions may be encoded as 32×32 prediction partitions and the fourth 32×32 prediction partition may be further partitioned into four 16×16 prediction partitions. Three of the four 16×16 prediction partitions may be encoded as 16×16 prediction partitions and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

In some implementations, video coding for a current block may include identifying an optimal prediction coding mode from multiple candidate prediction coding modes, which may provide flexibility in handling video signals with various statistical properties and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes may be reduced by limiting the set of available candidate prediction coding modes based on similarities between the current block and a corresponding prediction block. In some implementations, the complexity of searching each candidate prediction coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, block-based coding efficiency may be improved by partitioning a current residual block into one or more transform partitions, which may be rectangular, including square, partitions for transform coding. In some implementations, video coding, such as video coding using transform partitioning, may include selecting a uniform transform partitioning scheme. For example, a current residual block, such as block 610, may be a 64×64 block and may be transformed without partitioning using a 64×64 transform.

Although not expressly shown in FIG. 6, a residual block may be transform partitioned using a uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

In some implementations, video coding, such as video coding using transform partitioning, may include identifying multiple transform block sizes for a residual block using multiform transform partition coding. In some implementations, multiform transform partition coding may include recursively determining whether to transform a current block using a current block size transform or by partitioning the current block and multiform transform partition coding each partition. For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into partitions, such as four 32×32 blocks 620, and multiform transform partition coding each partition. In some implementations, determining whether to transform partition the current block may be based on comparing a cost for encoding the current block using a current block size transform to a sum of costs for encoding each partition using partition size transforms.

Figure 7:
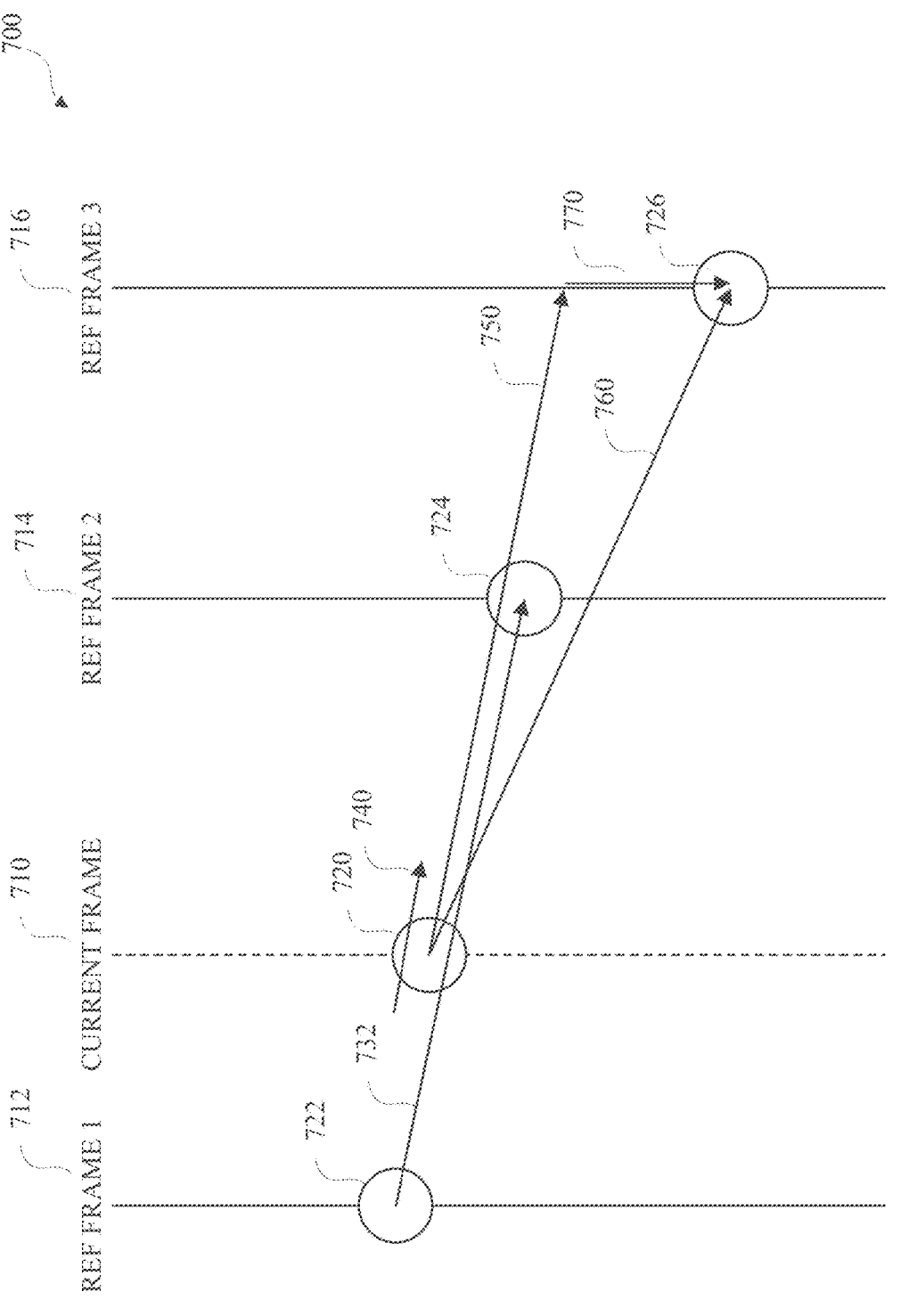
FIG. 7 is a diagram of an example of video coding using linear projection-based motion estimation in accordance with implementations of this disclosure.

FIG. 7 is a diagram of an example of video coding using linear projection-based motion estimation 700 in accordance with implementations of this disclosure. Video coding, such as encoding or decoding, using linear projection-based motion estimation 700 may be implemented by an encoder, such as the encoder 400 shown in FIG. 4.

Coding using linear projection-based motion estimation 700 includes encoding an input video steam, such as the input video stream 402 shown in FIG. 4, or one or more portions thereof, to generate an encoded (compressed) output bitstream, such as the encoded (compressed) bitstream 404 shown in FIG. 4, or a decoder, such as the decoder 500 shown in FIG. 5.

In block-based hybrid video coding, to reduce, or minimize, the resource utilization, such as bandwidth utilization, for signaling, storing, or both, compressed, or encoded, video data, redundant data, such as spatially redundant data, temporally redundant data, or both, is omitted or excluded from the compressed, or encoded, data.

Encoding using linear projection-based motion estimation 700 includes obtaining input video data, obtaining a current frame, obtaining a current block, obtaining a motion vector prediction for the current block, obtaining a motion vector for encoding the current block, obtaining a differential motion vector, encoding the differential motion vector, obtaining an encoded current block, including the encoded differential motion vector in an encoded bitstream, and outputting the encoded bitstream. The output, compressed, or encoded, bitstream, is output, such as stored or transmitted, such as to a decoder. Although not shown expressly in FIG. 7, encoding using linear projection-based motion estimation 700 includes other aspects of video coding.

The input video data is obtained. The input video data includes a sequence of frames (input frames). For example, the encoder, or a component thereof, such as an intra/inter prediction unit of the encoder, such as the intra/inter prediction unit 410 shown in FIG. 4, may obtain the input video stream.

FIG. 7 shows a video sequence including a current frame 710, a first reference frame 712 (REF FRAME 1), sequentially immediately preceding the current frame 710, a second reference frame 714 (REF FRAME 2), sequentially subsequent to the current frame 710, and a third reference frame 716 (REF FRAME 3), sequentially subsequent to the current frame 710 and the second reference frame 714. The first reference frame 712, the second reference frame 714, and the third reference frame 716 are decoded prior to coding, such as encoding or decoding, the current frame 710. FIG. 7 shows an example with respect to a current block 720 of the current frame 710. A first previously reconstructed block 722 of the first previously reconstructed frame 712 is shown. A second previously reconstructed block 724 of the second previously reconstructed frame 714 is shown. A third previously reconstructed block 726 of the third previously reconstructed frame 716 is shown.

The current frame 710 for encoding is obtained from the sequence of frames from the input video data. The current frame 710 may be obtained subsequent to encoding one or more other frames, such as a frame sequentially preceding the current frame 710 in the input video stream, and generating, or otherwise obtaining, a corresponding reconstructed frame (or frames), or one or more portions thereof, for use as a reference frame (or frames) for encoding the current frame 710.

The current block 720 for encoding is obtained from the current frame 710. The current block 720 may be obtained subsequent to encoding one or more other blocks, such as a block sequentially preceding the current block in the current frame 710, in accordance with a block coding order for coding the current frame 710, and generating, or otherwise obtaining, a corresponding reconstructed block, or one or more portions thereof.

A motion vector prediction for the current block 720 is obtained using linear projection. For example, obtaining the motion vector prediction may include obtaining previously reconstructed motion vectors for one or more of the reference frames 712, 714, 716, linearly projecting the motion vectors to the current frame 710 to obtain a location, or block location, in the current frame 710 intersecting the linear projection of a respective previously reconstructed motion vector, linearly unifying the motion vector, or motion vectors, to obtain a velocity of the current block, and obtaining the motion vector prediction for the current block 720 using the velocity for the current block 720.

A first previously reconstructed motion vector 732 is obtained from the first previously reconstructed block 722 of the first previously reconstructed frame 712. The first previously reconstructed motion vector 732 indicates the second previously reconstructed block 724 of the second previously reconstructed frame 714.

A projected velocity 740 is obtained for the current block 720 using linear projection based on the first previously reconstructed motion vector 732.

The motion vector prediction 750 is obtained using the projected velocity 740, the first previously reconstructed motion vector 732, or both.

A motion vector 760 for encoding the current block 720 is obtained, such as using motion estimation.

A differential motion vector 770 for encoding the current block 720 is obtained as a difference between the motion vector 760 for encoding the current block 720 and the motion vector prediction 750 for encoding the current block 720, such as by subtracting the motion vector prediction 750 from the motion vector 760.

The differential motion vector 770 is encoded to obtain encoded differential motion vector data.

The encoded differential motion vector data is included in an encoded bitstream.

The encoded bitstream is output, such as stored or transmitted to a decoder.

Decoding using linear projection-based motion estimation 700 includes generating reconstructed video data by decoding an encoded bitstream, such as the compressed bitstream 502 shown in FIG. 5, or one or more portions thereof, to generate a reconstructed video, or a portion thereof, such as the output video stream 504 shown in FIG. 5.

Decoding the encoded bitstream, or one or more portions thereof, for decoding using linear projection-based motion estimation 700, includes obtaining the encoded bitstream, obtaining a current encoded frame, obtaining a current encoded block, obtaining a motion vector prediction for the current encoded block, obtaining an encoded differential motion vector, decoding the encoded differential motion vector, obtaining a motion vector, obtaining a decoded block, including the decoded block in reconstructed video data, and outputting the reconstructed video data. One or more aspects of decoding using linear projection-based motion estimation 700 may be omitted from the description herein for simplicity and brevity.

The encoded bitstream is obtained. For example, the decoder, or a component thereof, such as an intra/inter prediction unit of the decoder, such as the entropy decoding unit 510 shown in FIG. 5, may obtain the encoded bitstream. Obtaining the encoded bitstream includes identifying a current frame from a current sequence of frames to decode from the encoded bitstream to generate a current reconstructed frame.

The current encoded frame, corresponding to the current frame 710, is obtained from the encoded bitstream.

The current encoded block, corresponding to the current block 720, is obtained from the encoded bitstream.

The motion vector prediction for the current encoded block is obtained using linear projection. For example, obtaining the motion vector prediction may include obtaining previously reconstructed motion vectors for one or more of the reference frames 712, 714, 716, linearly projecting the motion vectors to the current frame 710 to obtain a location, or block location, in the current frame 710 intersecting the linear projection of a respective previously reconstructed motion vector, linearly unifying the motion vector, or motion vectors, to obtain a velocity of the current block, and obtaining the motion vector prediction for the current encoded block using the velocity for the current encoded block.

The first previously reconstructed motion vector 732 is obtained from the first previously reconstructed block 722 of the first previously reconstructed frame 712.

The projected velocity 740 is obtained for the current block 720 using linear projection based on the first previously reconstructed motion vector 732.

The motion vector prediction 750 is obtained using the projected velocity 740, the first previously reconstructed motion vector 732, or both.

The encoded differential motion vector is obtained from the encoded bitstream.

The encoded differential motion vector is decoded to obtain a differential motion vector.

The motion vector is obtained as a sum of the decoded differential motion vector and the motion vector prediction.

The decoded block is obtained using the motion vector.

The decoded block is included in reconstructed frame data for the current frame 710. The reconstructed frame data for the current frame 710 is included in reconstructed video data.

The reconstructed video data is output, such as stored or presented.

Linear projection-based motion estimation 700 may be sub-optimal, such as inaccurate or inefficient, such as with respect to the resource utilization of encoding the differential motion vector 770, for non-linear motion.

Figure 8:
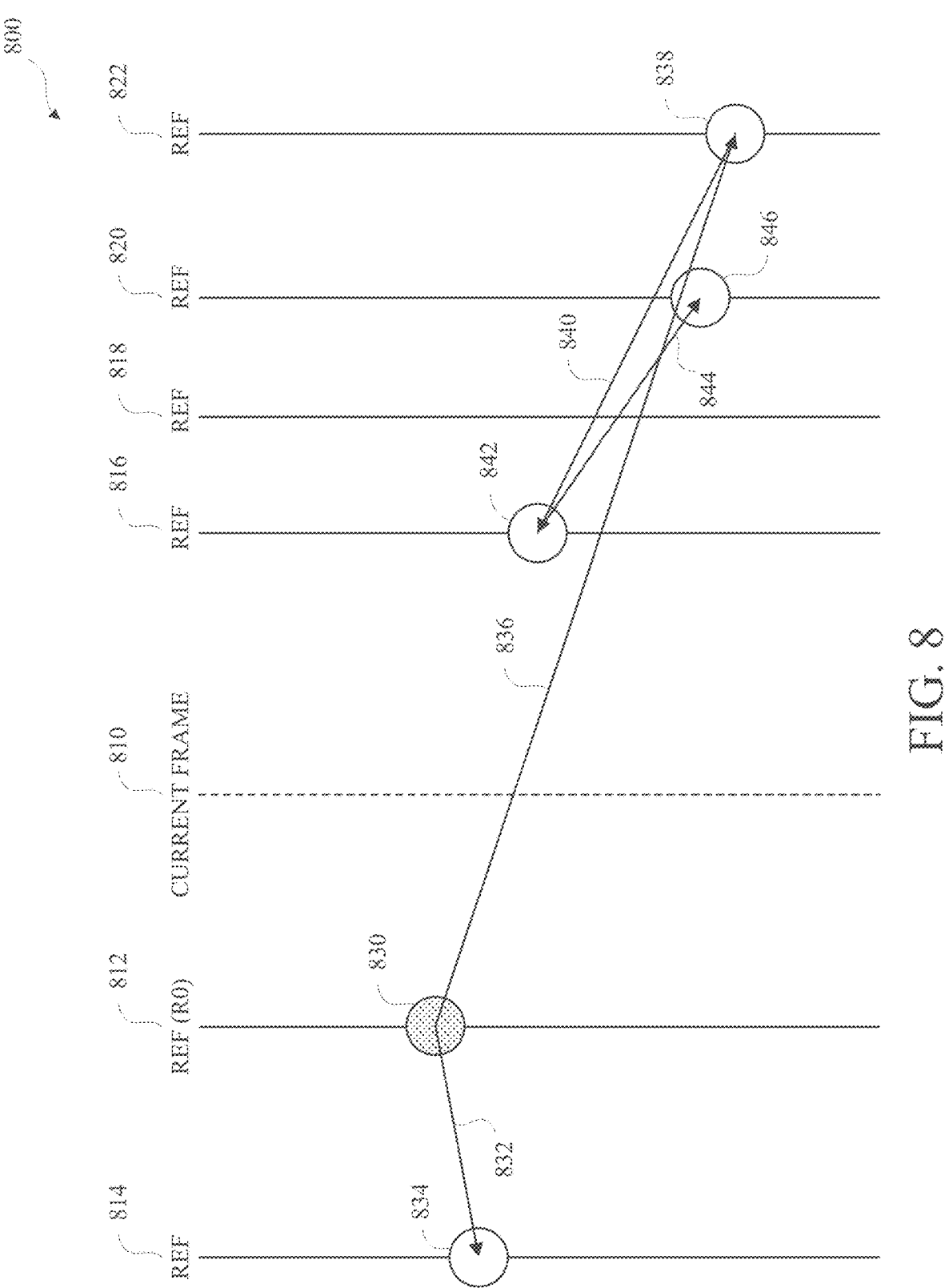
FIG. 8 is a diagram of an example of breadth-first recursive motion trajectory tracing in accordance with implementations of this disclosure.

FIG. 8 is a diagram of an example of breadth-first recursive motion trajectory tracing 800 in accordance with implementations of this disclosure. Breadth-first recursive motion trajectory tracing 800 may be implemented in an encoder, such as the encoder 400 shown in FIG. 4, a decoder, such as the decoder 500 shown in FIG. 5, or both. Breadth-first recursive motion trajectory tracing 800 includes aspects of a first portion of motion vector prediction with derived motion trajectory as described herein. Motion vector prediction with derived motion trajectory includes block-based hybrid video coding as described herein.

FIG. 8 shows a current frame 810, a first previously reconstructed reference frame 812 (R0), a second previously reconstructed reference frame 814, a third previously reconstructed reference frame 816, a fourth previously reconstructed reference frame 818, a fifth previously reconstructed reference frame 820, and a sixth previously reconstructed reference frame 822. Fewer or more previously reconstructed reference frames may be used. The current frame 810 and the previously reconstructed reference frames 812, 814, 816, 818, 820, 822 are shown in input, display, or sequential order from left to right. The encoding order may differ from the input or display order.

The first previously reconstructed reference frame 812 (R0) is the most recently decoded reference frame, decoded immediately prior to coding the current frame 810. For simplicity and brevity, FIG. 8 shows breadth-first recursive motion trajectory tracing 800 with respect to a first previously reconstructed block 830 from the first previously reconstructed reference frame 812 (R0).

Breadth-first recursive motion trajectory tracing 800 includes obtaining the first previously reconstructed block 830 from the first previously reconstructed reference frame 812 (R0). For example, the first previously reconstructed block 830 may be an 8×8-pixel block. Other block sizes may be used. The first previously reconstructed block 830 from the first previously reconstructed reference frame 812 (R0) is an inter-prediction coded block. The first previously reconstructed block 830 from the first previously reconstructed reference frame 812 (R0) is coded using multi-reference prediction.

Decoded, or reconstructed, block data from the first previously reconstructed block 830 from the first previously reconstructed reference frame 812 (R0) includes a first previously reconstructed motion vector 832 indicating a first location 834 in the second previously reconstructed reference frame 814, such as corresponding to a portion, such as an 8×8-pixel portion, of the second previously reconstructed reference frame 814. The previously reconstructed data from the portion of the second previously reconstructed reference frame 814 corresponding to, or indicated by, the first location 834 indicates that the pixels in the first location 834 are intra-coded pixels.

The decoded, or reconstructed, block data from the first previously reconstructed block 830 from the first previously reconstructed reference frame 812 (R0) includes a second previously reconstructed motion vector 836 indicating a second location 838 in the sixth previously reconstructed reference frame 822, corresponding to, or indicating, a portion, such as an 8×8-pixel portion, of the sixth previously reconstructed reference frame 822.

The previously reconstructed data from the portion of the sixth previously reconstructed reference frame 822 corresponding to, or indicated by, the second location 838 indicates that one or more of the pixels in the portion of the sixth previously reconstructed reference frame 822 corresponding to, or indicated by, the second location 838 are inter-prediction coded pixels, coded using a third previously reconstructed motion vector 840. Although, for simplicity, the inter-prediction coded pixels in the portion of the sixth previously reconstructed reference frame 822 corresponding to, or indicated by, the second location 838 are shown and described as coded using the third previously reconstructed motion vector 840, the previously reconstructed data for the second location 838 may include multiple previously reconstructed motion vectors.

In some implementations, for a portion of a previously reconstructed reference frame indicated by a location that includes multiple previously reconstructed motion vectors, the identified previously reconstructed motion vector may be a previously reconstructed motion vector from the previously reconstructed motion vectors from the portion indicated by the location that is the most closely block aligned motion vector.

In some implementations, for a portion of a previously reconstructed reference frame indicated by a location that includes multiple previously reconstructed motion vectors, the identified previously reconstructed motion vector may be an average of the previously reconstructed motion vectors from the portion indicated by the location.

In some implementations, for a portion of a previously reconstructed reference frame indicated by a location that includes multiple previously reconstructed motion vectors, the identified previously reconstructed motion vectors may be used as the identified previously reconstructed motion vector.

The third previously reconstructed motion vector 840 indicates a third location 842 in the third previously reconstructed reference frame 816 that corresponds with, or indicates, a portion, such as an 8×8-pixel portion, of the third previously reconstructed reference frame 816. The previously reconstructed data from the portion indicated by the third location 842 in the third previously reconstructed reference frame 816 indicates that one or more of the pixels in the portion indicated by the third location 842 are inter-prediction coded pixels, coded using a fourth previously reconstructed motion vector 844. Although, for simplicity, the inter-prediction coded pixels in the portion indicated by the third location 842 are shown and described as coded using the fourth previously reconstructed motion vector 844, the previously reconstructed data for the portion indicated by the third location 842 may include multiple previously reconstructed motion vectors.

The fourth previously reconstructed motion vector 844 indicates a fourth location 846 in the fifth previously reconstructed reference frame 820 that corresponds with, or indicates, a portion, such as an 8×8-pixel portion, of the fifth previously reconstructed reference frame 820. The previously reconstructed data from the portion indicated by the fourth location 846 in the fifth previously reconstructed reference frame 820 indicates that the pixels in the portion indicated by the fourth location 846 are intra-coded pixels.

Figure 9:
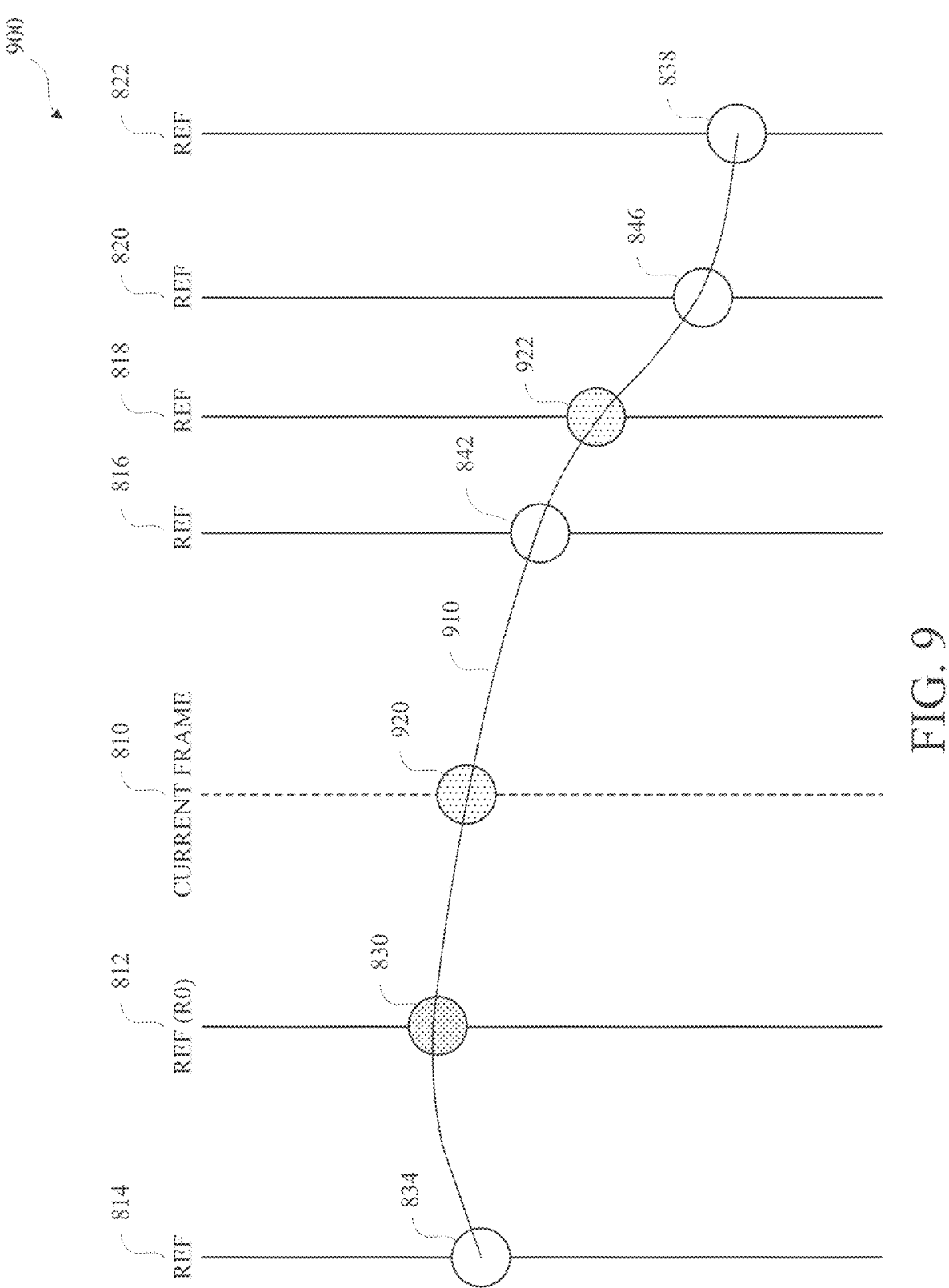
FIG. 9 is a diagram of an example of a second portion of motion vector prediction with derived motion trajectory in accordance with implementations of this disclosure.

FIG. 9 is a diagram of an example of a second portion of motion vector prediction with derived motion trajectory 900 in accordance with implementations of this disclosure. The second portion of motion vector prediction with derived motion trajectory 900 may be implemented in an encoder, such as the encoder 400 shown in FIG. 4, a decoder, such as the decoder 500 shown in FIG. 5, or both.

FIG. 9 shows the current frame 810 shown in FIG. 8, the first previously reconstructed reference frame 812 (R0) shown in FIG. 8, the second previously reconstructed reference frame 814 shown in FIG. 8, the third previously reconstructed reference frame 816 shown in FIG. 8, the fourth previously reconstructed reference frame 818 shown in FIG. 8, the fifth previously reconstructed reference frame 820 shown in FIG. 8, and the sixth previously reconstructed reference frame 822 shown in FIG. 8. Fewer or more previously reconstructed reference frames may be used.

FIG. 9 shows the first previously reconstructed block 830 from the first previously reconstructed reference frame 812 (R0), the first location 834 in the second previously reconstructed reference frame 814, the second location 838 in the sixth previously reconstructed reference frame 822, the third location 842 in the third previously reconstructed reference frame 816, and the fourth location 846 in the fifth previously reconstructed reference frame 820.

FIG. 9 shows a motion trajectory curve 910 obtained by curve fitting with respect to the first previously reconstructed reference frame 812 (R0), the first location 834 in the second previously reconstructed reference frame 814, the second location 838 in the sixth previously reconstructed reference frame 822, the third location 842 in the third previously reconstructed reference frame 816, and the fourth location 846 in the fifth previously reconstructed reference frame 820.

FIG. 9 shows a first derived location 920 in the current frame 810 intersecting the motion trajectory curve 910.

FIG. 9 shows a second derived location 922 in the fourth previously reconstructed reference frame 818 intersecting the motion trajectory curve 910.

Figure 10:
FIG. 10 is a flow diagram of an example of encoding using motion vector prediction with derived motion trajectory in accordance with implementations of this disclosure.
Figure 10:
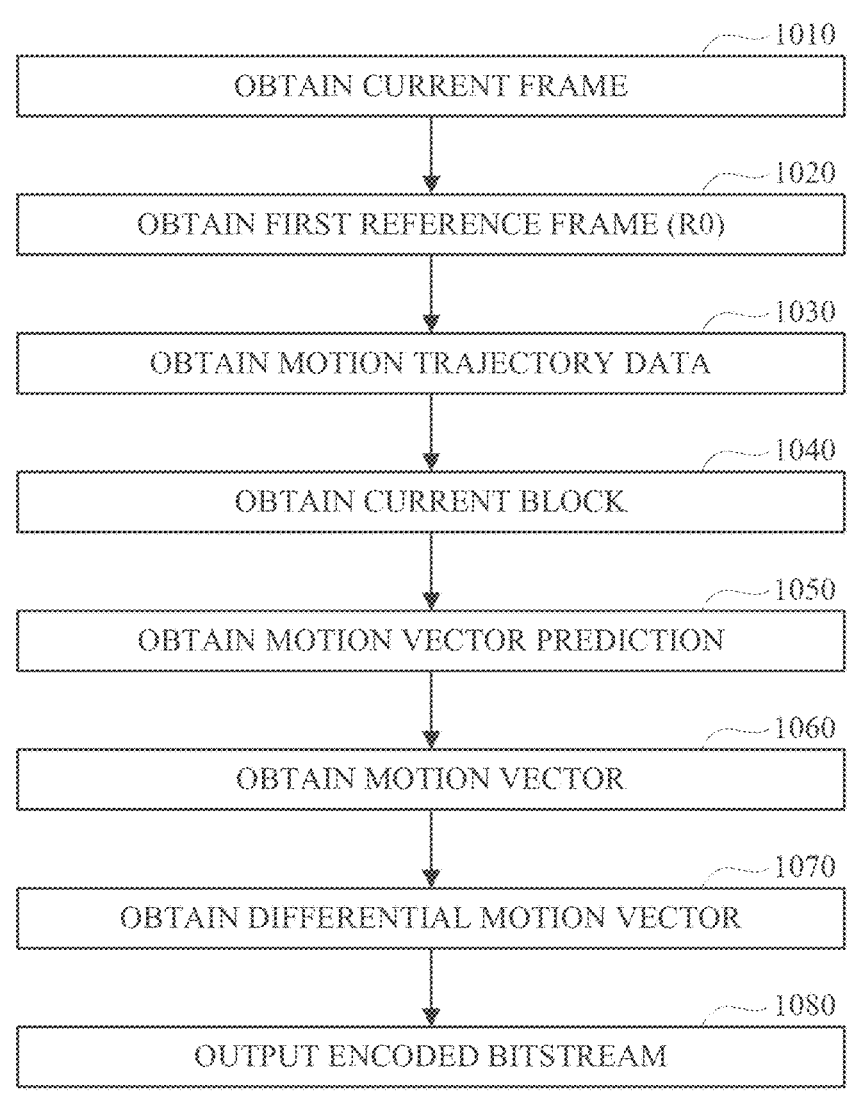

FIG. 10 is a flow diagram of an example of encoding using motion vector prediction with derived motion trajectory 1000 in accordance with implementations of this disclosure. Encoding using motion vector prediction with derived motion trajectory 1000 may be implemented by an encoder, such as the encoder 400 shown in FIG. 4.

Encoding using motion vector prediction with derived motion trajectory 1000 includes encoding an input video steam, such as the input video stream 402 shown in FIG. 4, or one or more portions thereof, to generate an encoded (compressed) output bitstream, such as the encoded (compressed) bitstream 404 shown in FIG. 4.

Encoding using motion vector prediction with derived motion trajectory 1000 includes obtaining a current frame (at 1010), obtaining a first previously reconstructed reference frame (at 1020), obtaining motion trajectory data (at 1030), obtaining a current block (at 1040), obtaining a motion vector prediction (at 1050), obtaining a motion vector (at 1060), obtaining a differential motion vector (at 1070), and outputting an encoded bitstream (at 1080). Although not shown expressly in FIG. 10, encoding using motion vector prediction with derived motion trajectory 1000 includes other aspects of video coding.

Input video data is obtained. The input video data includes a sequence of frames (input frames). For example, the encoder, or a component thereof, such as an intra/inter prediction unit of the encoder, such as the intra/inter prediction unit 410 shown in FIG. 4, may obtain the input video stream.

The current frame for encoding is obtained (at 1010) from the sequence of frames from the input video data. The current frame may be obtained (at 1010) subsequent to encoding one or more other frames, such as a frame sequentially preceding the current frame in the input video stream, and generating, or otherwise obtaining, a corresponding reconstructed frame (or frames), or one or more portions thereof, for use as a reference frame (or frames) for encoding the current frame. For example, the current frame may be the current frame 810 shown in FIGS. 8 and 9.

A first previously reconstructed reference frame is obtained (at 1020). For example, the first previously reconstructed reference frame may be the first previously reconstructed reference frame 812 (R0) shown in FIGS. 8 and 9. The first previously reconstructed reference frame, which is the most recently decoded, or reconstructed, reference frame, may be the reference frame decoded, or reconstructed, immediately preceding encoding the current frame. As shown, the first previously reconstructed reference frame sequentially, such as in display or input order, immediately precedes the current frame.

Figure 12:
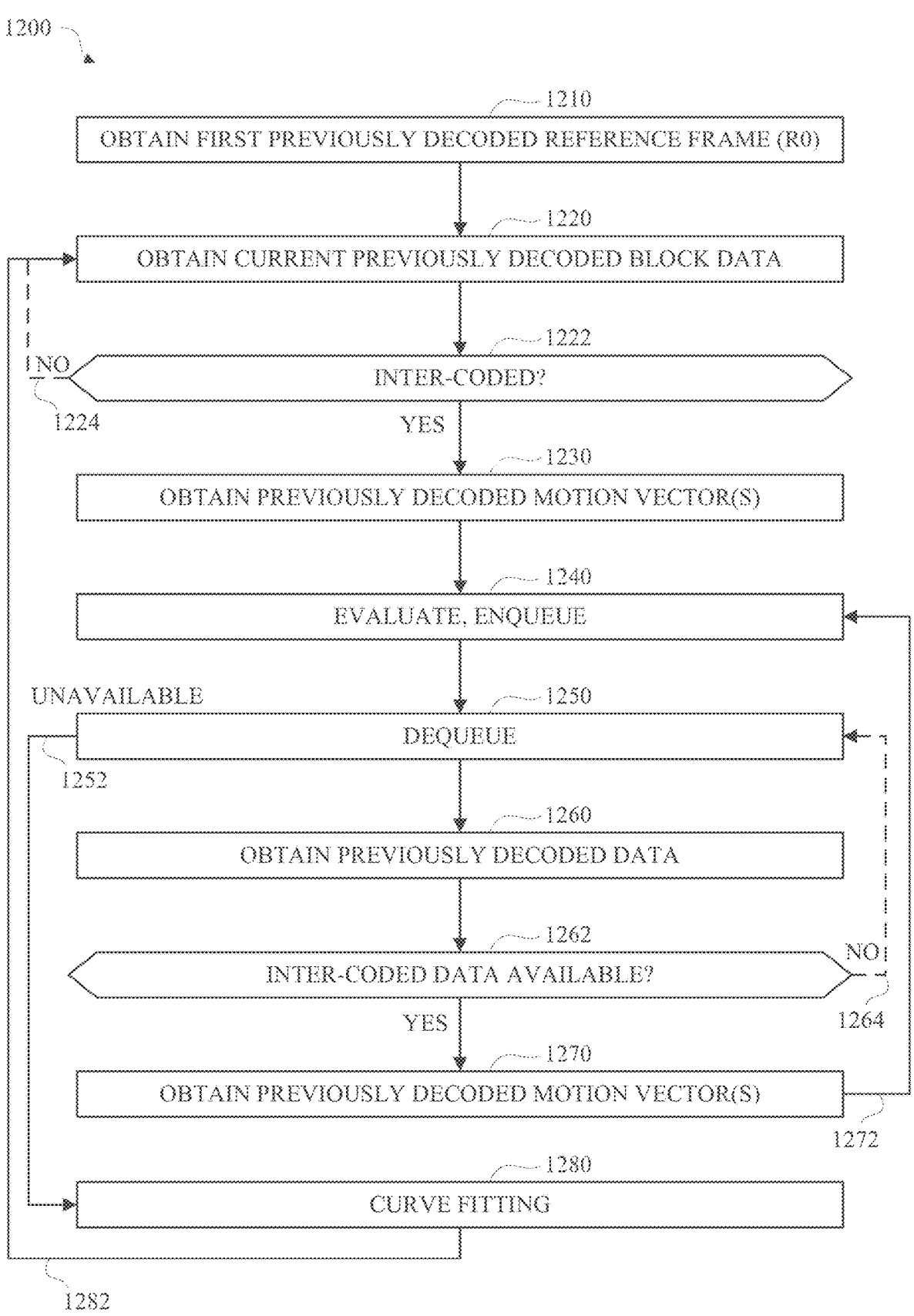
FIG. 12 is a flow diagram of an example of obtaining motion trajectory data in accordance with implementations of this disclosure.
Figure 13:
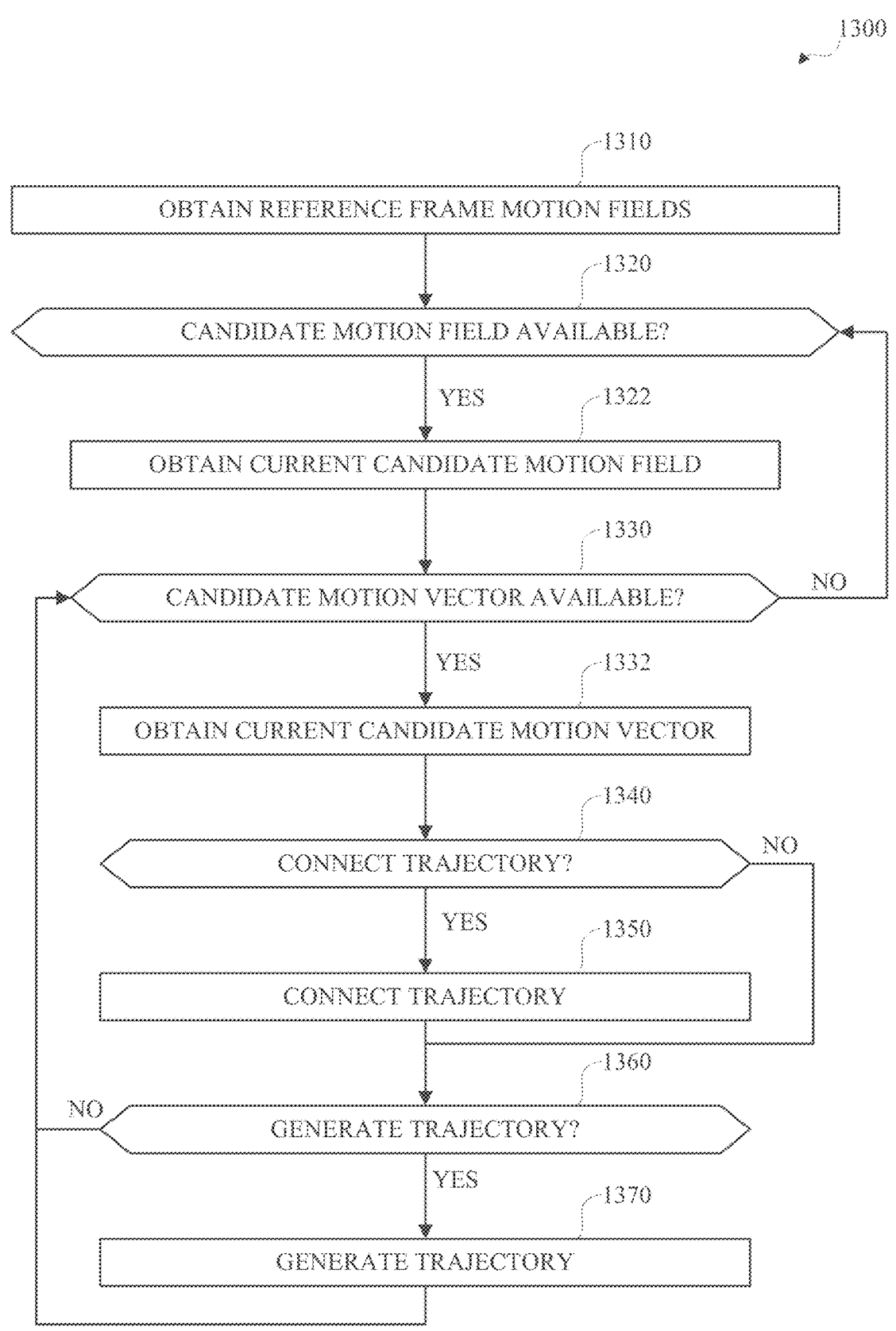
FIG. 13 is a flow diagram of another example of obtaining motion trajectory data in accordance with implementations of this disclosure.

Motion trajectory data is obtained (at 1030) for the first previously reconstructed reference frame. Examples of obtaining motion trajectory data are shown in FIGS. 12 and 13. The current block for encoding is obtained (at 1040) from the current frame. The current block may be obtained (at 1040) subsequent to encoding one or more other blocks, such as a block sequentially preceding the current block in the current frame, in accordance with a block coding order for coding the current frame, and generating, or otherwise obtaining, a corresponding reconstructed block, or one or more portions thereof.

One or more motion vector predictions for the current block are obtained (at 1050) in accordance with the motion trajectory data (obtained at 1030). In some implementations, single-reference prediction may be used, and one motion vector prediction may be obtained. In some implementations, multi-reference prediction may be used, and multiple, such as two, motion vector predictions may be obtained.

The motion trajectory data (obtained at 1030) may include one or more motion trajectory curves, such as the motion trajectory curve 910 shown in FIG. 9, intersecting the current block. A respective motion vector prediction for the current block with respect to a respective reference frame may be obtained (at 1050) from a motion trajectory curve intersecting the current block from the motion trajectory data (obtained at 1030), wherein the respective motion vector prediction indicates a spatial displacement between the current block, in the current frame, and a location in the respective reference frame intersecting the respective motion trajectory curve.

In some implementations, the motion trajectory data (obtained at 1030) may include multiple motion trajectory curves that intersect the current block. In some implementations, obtaining the intersecting motion trajectory curve from the multiple motion trajectory curves intersecting the current block, may include using a defined, with reference to sequential order, motion trajectory curve, such as the sequentially first identified motion trajectory curve or the sequentially last identified motion trajectory curve, as the intersecting motion trajectory curve.

In some implementations, obtaining the intersecting motion trajectory curve from the multiple motion trajectory curves intersecting the current block, may include identifying a best matching motion trajectory curve from the multiple motion trajectory curves, wherein the best matching motion trajectory curve is determined based on evaluating differences between the portions, such as 8×8-pixel portions, in the reference frames intersecting the respective motion trajectory curve, such as using a sum of absolute differences, and using the best matching motion trajectory curve as the intersecting motion trajectory curve.

One or more motion vectors for encoding the current block are obtained (at 1060). In some implementations, single-reference prediction may be used, and one motion vector may be obtained. In some implementations, multi-reference prediction may be used, and multiple, such as two, motion vectors may be obtained.

One or more differential motion vectors for the current block are obtained (at 1070). A respective differential motion vector for the current block is a difference between a respective motion vector for encoding the current block (obtained at 1060) and a respective motion vector prediction for the current block (obtained at 1050), which may be obtained by subtracting (e.g., a result of subtracting) the respective motion vector prediction for the current block (obtained at 1050) from the respective motion vector for encoding the current block (obtained at 1060). In some implementations, single-reference prediction may be used, and one differential motion vector may be obtained. In some implementations, multi-reference prediction may be used, and multiple, such as two, differential motion vectors may be obtained.

The output, compressed, or encoded, bitstream, is output, such as stored or transmitted, such as to a decoder, (at 1080). The differential motion vector is, or differential motion vectors are, encoded to obtain encoded differential motion vector data. The encoded differential motion vector data is included in the output, compressed, or encoded, bitstream. Although not expressly shown in FIG. 10, encoded block data for the current block is obtained by encoding the current block using the motion vector, or motion vectors, for the current block (obtained at 1060), and the encoded block data is included in the output, compressed, or encoded, bitstream. In some implementations, data, such as a bit or a flag, may be included in the compressed, or encoded, bitstream indicating that the current frame, or a portion thereof, is coded using motion vector prediction with derived motion trajectory.

Figure 11:
FIG. 11 is a flow diagram of an example of decoding using motion vector prediction with derived motion trajectory in accordance with implementations of this disclosure.
Figure 11:
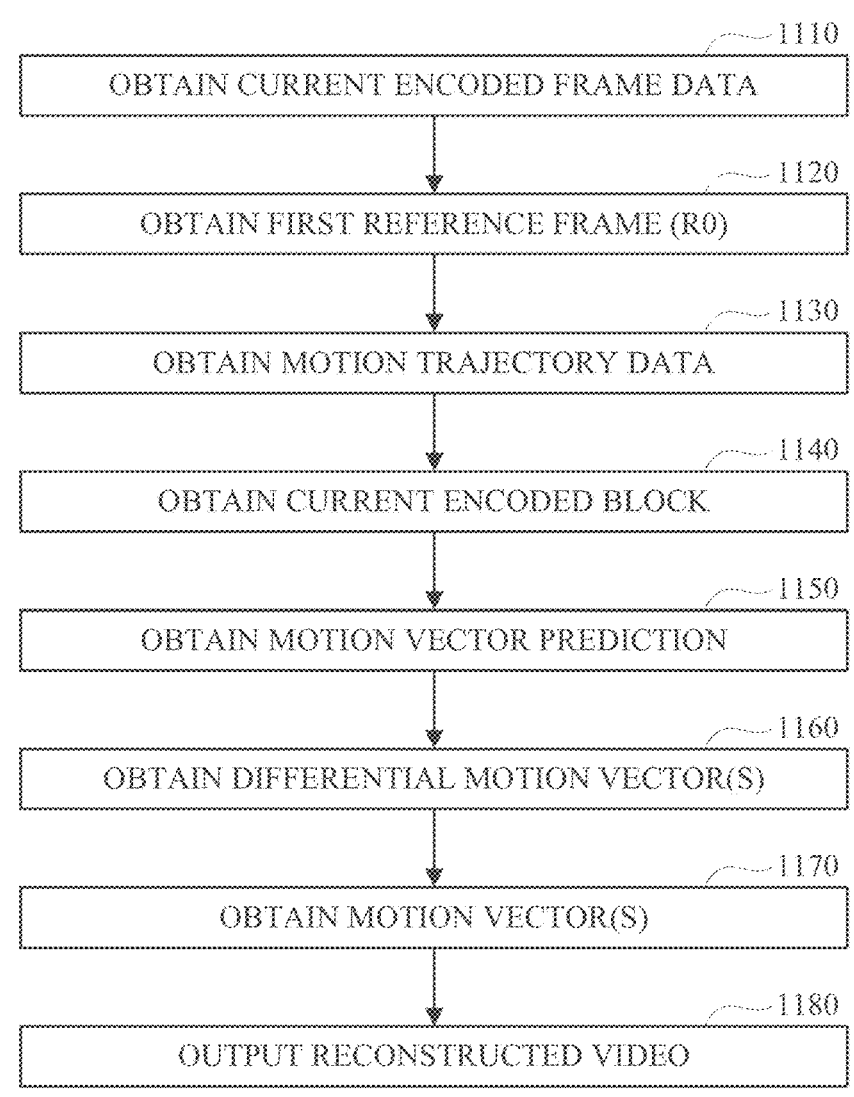

FIG. 11 is a flow diagram of an example of decoding using motion vector prediction with derived motion trajectory 1100 in accordance with implementations of this disclosure. Decoding using motion vector prediction with derived motion trajectory 1100 may be implemented in a decoder, such as the decoder 500 shown in FIG. 5. Decoding using motion vector prediction with derived motion trajectory 1100 includes block-based hybrid video coding as described herein.

Decoding using motion vector prediction with derived motion trajectory 1100 includes generating reconstructed video data by decoding an encoded bitstream, such as the compressed bitstream 502 shown in FIG. 5, or one or more portions thereof, to generate a reconstructed video, or a portion thereof, such as the output video stream 504 shown in FIG. 5.

Decoding the encoded bitstream, or one or more portions thereof, for decoding using motion vector prediction with derived motion trajectory 1100, includes obtaining encoded frame data for the current frame from the encoded bitstream (at 1110), obtaining a first previously reconstructed reference frame (at 1120), obtaining motion trajectory data (at 1130), obtaining current encoded block data (at 1140), obtaining a motion vector prediction (at 1150), obtaining a differential motion vector (at 1160), obtaining a motion vector (at 1170), and outputting reconstructed video data (at 1180). One or more aspects of decoding using motion vector prediction with derived motion trajectory 1100 may be omitted from the description herein for simplicity and brevity.

The encoded bitstream is obtained (at 1110). For example, the decoder, or a component thereof, such as an intra/inter prediction unit of the decoder, such as the entropy decoding unit 510 shown in FIG. 5, may obtain the encoded bitstream. Obtaining the encoded bitstream includes identifying a current frame from a current sequence of frames to decode from the encoded bitstream to generate a current reconstructed frame. The encoded frame data for the current frame is obtained from the encoded bitstream (at 1110).

In some implementations, obtaining the current encoded frame data may include obtaining, such as by decoding from the encoded bitstream, data, such as a bit or flag, indicating the use of motion vector prediction with derived motion trajectory for the current frame, or a portion thereof.

A first previously reconstructed reference frame is obtained (at 1120), such as from a reference frame buffer. For example, the first previously reconstructed reference frame may be the first previously reconstructed reference frame 812 (R0) shown in FIGS. 8 and 9. The first previously reconstructed reference frame, which is the most recently decoded, or reconstructed, reference frame, may be the reference frame decoded, or reconstructed, immediately preceding decoding the current frame. As shown, the first previously reconstructed reference frame sequentially, such as in display or input order, immediately precedes the current frame.

Motion trajectory data, which may include one or more motion trajectory curves, such as the trajectory curve 910 shown in FIG. 9, is obtained (at 1130) for the first previously reconstructed reference frame. Examples of obtaining motion trajectory data are shown in FIGS. 12 and 13.

The current encoded block data for decoding, or reconstructing, a current block of the current frame is obtained (at 1140) such as from the encoded bitstream, such as from the encoded frame data (obtained at 1110). The current encoded block data may be obtained (at 1140) subsequent to decoding one or more other blocks, such as a block sequentially preceding the current block in the current frame, in accordance with a block coding order for coding the current frame, and generating, or otherwise obtaining, a corresponding reconstructed block, or one or more portions thereof.

One or more motion vector predictions for the current block are obtained (at 1150) in accordance with the motion trajectory data (obtained at 1130). In some implementations, single-reference prediction may be used, and one motion vector prediction may be obtained. In some implementations, multi-reference prediction may be used, and multiple, such as two, motion vector predictions may be obtained.

The motion trajectory data (obtained at 1130) may include one or more motion trajectory curves, such as the motion trajectory curve 910 shown in FIG. 9, intersecting the current block. A respective motion vector prediction for the current block with respect to a respective reference frame may be obtained (at 1150) from a motion trajectory curve intersecting the current block from the motion trajectory data (obtained at 1130), wherein the respective motion vector prediction indicates a spatial displacement between the current block, in the current frame, and a location in the respective reference frame intersecting the respective motion trajectory curve.

In some implementations, the motion trajectory data (obtained at 1130) may include multiple motion trajectory curves that intersect the current block. In some implementations, obtaining the intersecting motion trajectory curve from the multiple motion trajectory curves intersecting the current block, may include using a defined, with reference to sequential order, motion trajectory curve, such as the sequentially first identified motion trajectory curve or the sequentially last identified motion trajectory curve, as the intersecting motion trajectory curve.

In some implementations, obtaining the intersecting motion trajectory curve from the multiple motion trajectory curves intersecting the current block, may include identifying a best matching motion trajectory curve from the multiple motion trajectory curves, wherein the best matching motion trajectory curve is determined based on evaluating differences between the portions, such as 8×8-pixel portions, in the reference frames intersecting the respective motion trajectory curve, such as using a sum of absolute differences, and using the best matching motion trajectory curve as the intersecting motion trajectory curve.

One or more differential motion vectors for the current block are obtained (at 1160) by decoding, or otherwise accessing, the differential motion vector, or differential motion vectors, from the encoded bitstream, such as from the encoded block data for the current block. In some implementations, single-reference prediction may be used, and one differential motion vector may be obtained. In some implementations, multi-reference prediction may be used, and multiple, such as two, differential motion vectors may be obtained.

One or more motion vectors for decoding the current block are obtained (at 1170). In some implementations, single-reference prediction may be used, and one motion vector may be obtained. In some implementations, multi-reference prediction may be used, and multiple, such as two, motion vectors may be obtained. A respective motion vector for decoding the current block is obtained by combining, such as by adding, a respective motion vector prediction (obtained at 1150) and a corresponding differential motion vector (obtained at 1160).

The reconstructed video data is output (at 1180). Although not expressly shown in FIG. 11, the motion vector, or motion vectors, are used to obtain decoded, or reconstructed, block data for the current block. The decoded, or reconstructed, block data for the current block is included in decoded, or reconstructed, frame data for the current frame. The decoded, or reconstructed, frame data for the current frame is included in the reconstructed video data. Outputting the reconstructed video data includes storing the reconstructed video data, outputting the reconstructed video data for presentation, or both.

FIG. 12 is a flow diagram of an example of obtaining motion trajectory data 1200 in accordance with implementations of this disclosure. Obtaining motion trajectory data 1200 may be implemented in an encoder, such as the encoder 400 shown in FIG. 4, a decoder, such as the decoder 500 shown in FIG. 5, or both. Obtaining motion trajectory data 1200 is similar to obtaining motion trajectory curves as shown in FIG. 10 (at 1030) or FIG. 11 (at 1130).

Obtaining motion trajectory data 1200 includes breadth-first motion trajectory tracing. Obtaining motion trajectory data 1200 includes obtaining a first previously reconstructed reference frame (R0) (at 1210), obtaining current previously reconstructed block data (at 1220), determining whether the current previously reconstructed block data is inter-prediction coded (at 1222), obtaining one or more previously reconstructed motion vectors (at 1230), evaluating and enqueuing (at 1240), dequeueing (at 1250), obtaining current previously reconstructed data (at 1260), determining whether inter-prediction coded data is available from the current previously reconstructed data (at 1262), obtaining one or more previously reconstructed motion vectors (at 1270), and curve fitting (at 1280).

The first previously reconstructed reference frame (R0), such as the first previously reconstructed reference frame (R0) 812 shown in FIGS. 8 and 9, is obtained (at 1210), such as from a reference frame buffer. The first previously reconstructed reference frame (R0) is a most recently decoded, or reconstructed, reference frame.

Obtaining motion trajectory data 1200 includes obtaining a respective motion trajectory curve on a per-block basis, with respect to inter-prediction coded blocks from the first previously reconstructed reference frame (R0).

Current previously reconstructed block data is obtained (at 1220) for a current block, such as an 8×8 block, of the first previously reconstructed reference frame (R0). The current previously reconstructed block data may be obtained (at 1220) in a defined order, such as an order, such as raster, or forward zigzag, order. Other orders may be used.

Although not shown expressly in FIG. 12, obtaining the current previously reconstructed block data (at 1220) may include determining whether unevaluated previously reconstructed block data is available from the previously reconstructed frame data for the first previously reconstructed reference frame (R0). For example, the current previously reconstructed block data may be obtained in response to determining, or a determination, that unevaluated previously reconstructed block data is available from the previously reconstructed frame data for the first previously reconstructed reference frame (R0).

In some implementations, unevaluated previously reconstructed block data is unavailable from the previously reconstructed frame data for the first previously reconstructed reference frame (R0), and obtaining motion trajectory data 1200 is otherwise skipped, avoided, excluded, omitted, or complete, for the current frame. For example, in response to determining, or a determination, that unevaluated previously reconstructed block data is unavailable from the previously reconstructed frame data for the first previously reconstructed reference frame (R0), obtaining motion trajectory data 1200 may be complete for the current frame.

Although described with respect to the first previously reconstructed reference frame (R0), obtaining motion trajectory data 1200 may be performed with respect to a portion of the first previously reconstructed reference frame (R0), such as a tile, or a superblock. For example, obtaining motion trajectory data 1200 with respect to a superblock may limit motion vector length to within one superblock adjacent to a current superblock.

Whether the current previously reconstructed block data is inter-prediction coded block data is determined (at 1222).

In some implementations, the current previously reconstructed block data is intra-prediction coded block data, obtaining motion trajectory data 1200 is otherwise skipped, avoided, excluded, or omitted, for the current previously reconstructed block data, and current previously reconstructed block data is obtained (at 1220) for another block, such as a subsequent block, of the first previously reconstructed reference frame (R0), as indicated (at 1224) by the broken directional line from determining whether the current previously reconstructed block data is inter-prediction coded (at 1222) to obtaining current previously reconstructed block data (at 1220). For example, in response to determining, or a determination, that the current previously reconstructed block data (obtained at 1220) is intra-prediction coded block data, and omits inter-prediction coded data, In some implementations, the current previously reconstructed block data is inter-prediction coded block data and obtaining motion trajectory data 1200 includes obtaining one or more previously reconstructed motion vectors (at 1230).

One or more previously reconstructed motion vectors are obtained (at 1230). For example, in response to determining, or a determination, (at 1222) that the current previously reconstructed block data (obtained at 1220) is inter-prediction coded block data, the one or more previously reconstructed motion vectors are obtained (at 1230) from the current previously reconstructed block data.

A respective previously reconstructed motion vector (obtained at 1230) indicates a respective previously reconstructed reference frame, other than the first previously reconstructed reference frame (R0), such as one of the second previously reconstructed reference frame 814, the third previously reconstructed reference frame 816, the fourth previously reconstructed reference frame 818, the fifth previously reconstructed reference frame 820, or the sixth previously reconstructed reference frame 822 shown in FIGS. 8 and 9.

In some implementations, the current previously reconstructed block data is multi-reference coded block data including multiple, such as two (bidirectional), previously reconstructed motion vectors, such as a first previously reconstructed motion vector and a second previously reconstructed motion vector, wherein the first previously reconstructed motion vector indicates, identifies, or is associated with, a second previously reconstructed reference frame, such as one of the second previously reconstructed reference frame 814, the third previously reconstructed reference frame 816, the fourth previously reconstructed reference frame 818, the fifth previously reconstructed reference frame 820, or the sixth previously reconstructed reference frame 822 shown in FIGS. 8 and 9, and the second previously reconstructed motion vector indicates, identifies, or is associated with, a third previously reconstructed reference frame, such as a different one of the second previously reconstructed reference frame 814, the third previously reconstructed reference frame 816, the fourth previously reconstructed reference frame 818, the fifth previously reconstructed reference frame 820, or the sixth previously reconstructed reference frame 822 shown in FIGS. 8 and 9. For example, the current previously reconstructed block data may be for the first previously reconstructed block 830 shown in FIGS. 8 and 9, such that obtaining the one or more previously reconstructed motion vectors includes obtaining the first previously reconstructed motion vector 832 and the second previously reconstructed motion vector 836 shown in FIG. 8.

In some implementations, the current previously reconstructed block data is single-reference coded block data including one motion vector (unidirectional), such as a first previously reconstructed motion vector, wherein the first previously reconstructed motion vector indicates, identifies, or is associated with, a second previously reconstructed reference frame, such as one of the second previously reconstructed reference frame 814, the third previously reconstructed reference frame 816, the fourth previously reconstructed reference frame 818, the fifth previously reconstructed reference frame 820, or the sixth previously reconstructed reference frame 822 shown in FIGS. 8 and 9. For example, the current previously reconstructed block data may be similar to the first previously reconstructed block 830 shown in FIGS. 8 and 9, except omitting the first previously reconstructed motion vector 832, such that obtaining the one or more previously reconstructed motion vectors includes obtaining the second previously reconstructed motion vector 836 shown in FIG. 8.

The one or more previously reconstructed motion vectors (obtained at 1230 or at 1270) are evaluated (at 1240).

The previously reconstructed motion vectors, respectively, indicate a respective location corresponding to a portion, such as an 8×8-pixel portion, of another previously reconstructed reference frame. For example, a respective previously reconstructed motion vector may be the first previously reconstructed motion vector 832 shown in FIG. 8, indicating a first location 834 corresponding to a portion, such as an 8×8-pixel portion, of the second previously reconstructed reference frame 814 shown in FIG. 8. In another example, a respective previously reconstructed motion vector may be the second previously reconstructed motion vector 836 shown in FIG. 8, indicating a second location 838 corresponding to a portion, such as an 8×8-pixel portion, of the sixth previously reconstructed reference frame 822 shown in FIG. 8.

Evaluating the one or more previously reconstructed motion vectors includes, for a respective previously reconstructed motion vector, determining whether a previously identified, by obtaining motion trajectory data 1200 for the current previously reconstructed block of the first previously reconstructed reference frame (R0), trajectory tracing location in the previously reconstructed reference frame indicated by the respective previously reconstructed motion vector is available for the current previously reconstructed block.

In response to determining, or a determination, that the previously identified, by obtaining motion trajectory data 1200 for the current previously reconstructed block of the first previously reconstructed reference frame (R0), trajectory tracing location in the previously reconstructed reference frame indicated by the respective previously reconstructed motion vector is available for the current previously reconstructed block, the location in the previously reconstructed reference frame indicated by the respective previously reconstructed motion vector is ignored, skipped, or otherwise unused.

In some implementations, in response to determining, or a determination, that the previously identified, by obtaining motion trajectory data 1200 for the current previously reconstructed block of the first previously reconstructed reference frame (R0), trajectory tracing location in the previously reconstructed reference frame indicated by the respective previously reconstructed motion vector (current location) is available for the current previously reconstructed block, the previously identified trajectory tracing location is modified by combining, such as by averaging, the previously identified trajectory tracing location with the location in the previously reconstructed reference frame indicated by the previously reconstructed motion vector.

In response to determining, or a determination, that the previously identified, by obtaining motion trajectory data 1200 for the current previously reconstructed block of the first previously reconstructed reference frame (R0), trajectory tracing location in the previously reconstructed reference frame indicated by the respective previously reconstructed motion vector is unavailable for the current previously reconstructed block, the location in the previously reconstructed reference frame indicated by the respective previously reconstructed motion vector (current location) is identified as a trajectory tracing location (at 1240). Identifying the current location as a trajectory tracing location (at 1240) may include including the current location in current trajectory tracing location data.

In response to determining, or a determination, that the previously identified, by obtaining motion trajectory data 1200 for the current previously reconstructed block of the first previously reconstructed reference frame (R0), trajectory tracing location in the previously reconstructed reference frame indicated by the respective previously reconstructed motion vector is unavailable for the current previously reconstructed block, the location in the previously reconstructed reference frame indicated by the respective previously reconstructed motion vector is enqueued (at 1240) in a trajectory tracing queue, such as, as a trajectory tracing location. In some implementations, the trajectory tracing queue is a last-in-first-out queue.

Enqueuing the location in the previously reconstructed reference frame indicated by the respective previously reconstructed motion vector (at 1240) includes pushing, adding, including, or otherwise storing, data indicating the respective location in the previously reconstructed reference frame indicated by the respective previously reconstructed motion vector (current location) in the trajectory tracing queue.

For example, the current previously reconstructed block data may be for the first previously reconstructed block 830 shown in FIGS. 8 and 9, the one or more previously reconstructed motion vectors may include the first previously reconstructed motion vector 832 indicating the first location 834 in the second previously reconstructed reference frame 814 and the second previously reconstructed motion vector 836 indicating the second location 838 in the sixth previously reconstructed reference frame 822, as shown in FIG. 8, the first location 834 in the second previously reconstructed reference frame 814 may be enqueued in the trajectory tracing queue and, subsequently, the second location 838 in the sixth previously reconstructed reference frame 822 may be enqueued in the trajectory tracing queue.

In some implementations, instead of, or in addition to, enqueueing the respective locations, the respective previously reconstructed motion vectors may be enqueued in the trajectory tracing queue.

Current location data indicating a current location in a previously reconstructed reference frame (current previously reconstructed reference frame) is dequeued, popped, removed, or otherwise obtained, from the trajectory tracing queue (at 1250). In some implementations, dequeueing (at 1250) may include dequeueing a respective previously reconstructed motion vector instead of, or in addition to, the corresponding location data. The dequeued current location data may be the most recently enqueued location data.

Although not expressly shown in FIG. 12, in some implementations, dequeueing the current location data includes determining whether location data, or a corresponding previously reconstructed motion vector, is available from the trajectory tracing queue for the current previously reconstructed block of the first previously reconstructed reference frame (R0). For example, dequeueing the current location data may include dequeueing the current location data in response to determining, or a determination, that the current location data is available from the trajectory tracing queue.

In response to determining, or a determination, that location data, or previously reconstructed motion vector data, is unavailable from the trajectory tracing queue, (at 1250), a motion trajectory curve, such as the motion trajectory curve 910 shown in FIG. 9, is obtained, determined, calculated, or generated, by curve fitting (at 1280) in accordance with the trajectory tracing locations (identified at 1240), as indicated by the directional line (at 1252) from dequeueing (at 1250) to by curve fitting (at 1280).

Current previously reconstructed data corresponding to the location indicated by the current location data is obtained (at 1260) from the respective previously reconstructed reference frame that includes the location indicated by the current location data (obtained at 1250).

For example, the location indicated by the current location data may be the first location 834 in the second previously reconstructed reference frame 814 shown in FIG. 8, and the current previously reconstructed data obtained (at 1260) is previously reconstructed data for a portion, such as an 8×8-pixel portion, of the second previously reconstructed reference frame 814 indicated by the first location 834 as shown in FIG. 8.

In another example, the location indicated by the current location data may be the second location 838 in the sixth previously reconstructed reference frame 822 shown in FIG. 8, and the current previously reconstructed data obtained (at 1260) is previously reconstructed data for a portion, such as an 8×8-pixel portion, of the sixth previously reconstructed reference frame 822 indicated by the second location 838 as shown in FIG. 8.

Whether inter-prediction coded data is available from the current previously reconstructed data is determined (at 1262).

In some implementations, the portion of the previously reconstructed reference frame indicated by the current dequeued location data (obtained at 1250) includes intra-prediction coded pixels, from one or more blocks of the respective previously reconstructed reference frame, and inter-prediction coded data is unavailable from the current previously reconstructed data.

For example, current dequeued location data (obtained at 1250) may indicate the first location 834, indicates a portion, such as an 8×8-pixel portion, of the second previously reconstructed reference frame 814 shown in FIG. 8, the current previously reconstructed data obtained (at 1260) is previously reconstructed data from the portion of the second previously reconstructed reference frame 814 indicated by the first location 834 as shown in FIG. 8, which includes intra-prediction coded pixel data, wherein inter-prediction coded data is unavailable from the current previously reconstructed data.

In some implementations, in response to determining, or a determination, that inter-prediction coded data is unavailable from the current previously reconstructed data, obtaining motion trajectory data 1200 is otherwise skipped, avoided, excluded, omitted, or complete for the current, or dequeued, location data, and current location data for another location is dequeued (at 1250), as indicated (at 1264) by the broken directional line from determining whether inter-prediction coded data is available from the current previously reconstructed data (at 1262) to dequeueing (at 1250).

In some implementations, the portion of the previously reconstructed reference frame indicated by the current location data includes one or more inter-prediction coded pixels, from one or more blocks of the respective previously reconstructed reference frame, such that inter-prediction coded data is available from the current previously reconstructed data.

For example, the current location data may indicate the second location 838, indicating a portion, such as an 8×8-pixel portion, in the sixth previously reconstructed reference frame 822 shown in FIG. 8, the current previously reconstructed data obtained (at 1260) is previously reconstructed data from the portion of the sixth previously reconstructed reference frame 822 indicated by the second location 838, as shown in FIG. 8, which includes inter-prediction coded pixel data, such that inter-prediction coded data is available from the current previously reconstructed data.

Although the current previously reconstructed data (obtained at 1260) is shown and described as including single-reference motion data, the current previously reconstructed data (obtained at 1260) may include multi-reference motion data.

One or more previously reconstructed motion vectors are obtained (at 1270) using the current previously reconstructed data. For example, in response to determining, or a determination, (at 1262) that inter-prediction coded data, such as data for one or more inter-prediction coded pixels, in one or more blocks of the respective previously reconstructed reference frame, is available from the current previously reconstructed data, one or more previously reconstructed motion vectors corresponding to the inter-prediction coded pixels, are obtained (at 1270) from the current previously reconstructed data.

In some implementations, the current previously reconstructed data is block aligned (aligned with block boundaries) and single-reference predicted, and obtaining one or more previously reconstructed motion vectors (at 1270) includes obtaining a previously reconstructed motion vector from the current previously reconstructed data.

In some implementations, the current previously reconstructed data is block aligned and multi-reference predicted, and obtaining one or more previously reconstructed motion vectors (at 1270) includes obtaining multiple, such as two, previously reconstructed motion vectors from the current previously reconstructed data.

In some implementations, the current previously reconstructed data is unaligned with block boundaries and obtaining one or more previously reconstructed motion vectors (at 1270) includes obtaining one or more previously reconstructed motion vectors from the current previously reconstructed data by obtaining the motion vectors corresponding to a block of the respective reference frame most closely aligned with the corresponding location data, obtaining an average of the motion vectors from the current previously reconstructed data, or obtaining the multiple motion vectors indicated by the current previously reconstructed data.

Obtaining motion trajectory data 1200 includes evaluating and enqueuing (at 1240) with respect to the one or more previously reconstructed motion vectors obtained (at 1270), on a per-previously reconstructed motion vector basis, as indicated by the directional line (at 1272) from obtaining one or more previously reconstructed motion vectors (at 1270) to evaluating and enqueuing (at 1240).

In response to determining, or a determination, that location data, or previously reconstructed motion vector data, is unavailable from the trajectory tracing queue, (at 1250), a motion trajectory curve, such as the motion trajectory curve 910 shown in FIG. 9, for the current previously reconstructed block of the first previously reconstructed reference frame (R0) is obtained, determined, calculated, or generated, (at 1280) by curve fitting, such as linear curve fitting, polynomial curve fitting, piecewise linear curve fitting, natural splines curve fitting, or another type of curve fitting, in accordance with the trajectory tracing locations from the current trajectory tracing location data (obtained at 1240) for the current previously reconstructed block.

In some implementations, curve fitting may include weighting, such as using weights, such as confidence weights, with respect to the trajectory tracing locations (obtained at 1240) for the current previously reconstructed block. For example, the weights may be obtained in accordance with an accumulated temporal distance of motion vectors, a maximum temporal distance of motion vectors, an accumulated prediction error associated with a respective motion vector, a maximum prediction error associated with a respective motion vector, or a combination thereof.

In some implementations, multiple reference frames may be available for coding a current frame and the trajectory tracing locations (obtained at 1240) for the current previously reconstructed block may include location data with respect to a subset, which may be a proper subset, of the available reference frames.

A derived location, such as the first derived location 920 shown in FIG. 9, in the current frame intersecting the motion trajectory curve is obtained, derived, or otherwise determined.

One or more reference frames, such as the fourth previously reconstructed reference frame 818 shown in FIGS. 8 and 9, other than the reference frames indicated by the trajectory tracing locations, may be available for coding the current frame. For a reference frame, other than the reference frames indicated by the trajectory tracing locations, available for coding the current frame, a respective derived location, such as the second derived location 922 for the fourth previously reconstructed reference frame 818 shown in FIG. 9, intersecting the motion trajectory curve may be obtained, derived, or otherwise determined.

Subsequent to obtaining the motion trajectory curve for the current previously reconstructed block (at 1280), current previously reconstructed block data is obtained (at 1220) for another previously reconstructed block, such as a subsequent previously reconstructed block, of the first previously reconstructed reference frame (R0), as indicated (at 1282) by the directional line from curve fitting (at 1280) to obtaining current previously reconstructed block data (at 1220).

FIG. 13 is a flow diagram of another example of obtaining motion trajectory data 1300 in accordance with implementations of this disclosure. Obtaining motion trajectory data 1300 may be implemented in an encoder, such as the encoder 400 shown in FIG. 4, a decoder, such as the decoder 500 shown in FIG. 5, or both. Obtaining motion trajectory data 1300 is similar to obtaining motion trajectory curves as shown in FIG. 10 (at 1030) or FIG. 11 (at 1130).

Figure 14:
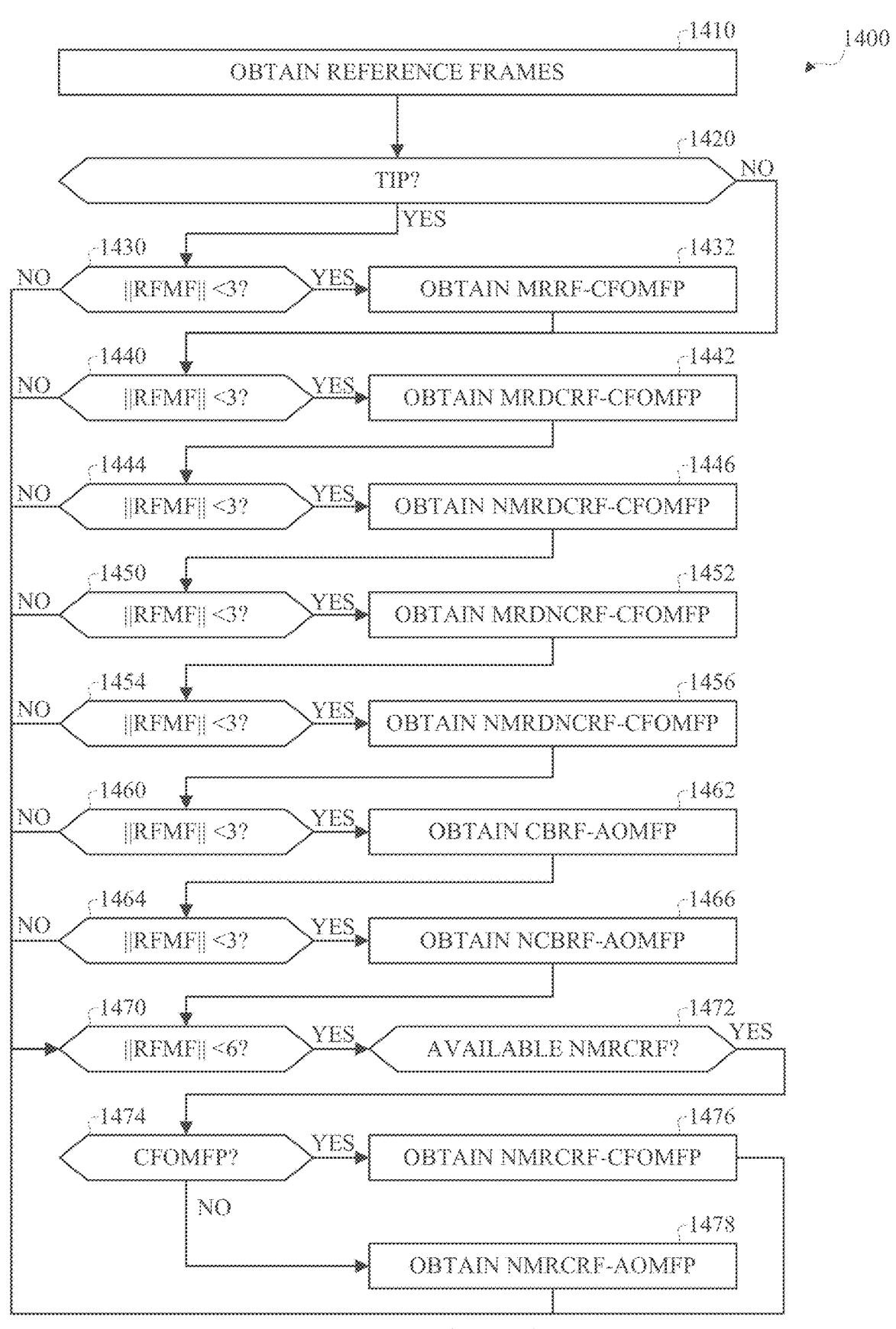
FIG. 14 is a flow diagram of an example of reference frame motion fields for coding a current frame in accordance with implementations of this disclosure

Obtaining motion trajectory data 1300 includes obtaining reference frame motion fields (at 1310). An example of obtaining reference frame motion field data is shown in FIG. 14.

Obtaining motion trajectory data 1300 includes determining whether unevaluated candidate motion field data is available from the reference frame motion field data (at 1320). The candidate motion fields from the reference frame motion field data may be evaluated, or processed, on a per-field basis, such as iteratively, or using parallel processing. Prior to evaluating a respective candidate motion field, the respective candidate motion field is an unevaluated candidate motion field. Subsequent to evaluating a respective candidate motion field, the respective candidate motion field is an evaluated candidate motion field.

Obtaining motion trajectory data 1300 includes, in response to a determination (yes at 1320) that unevaluated candidate motion field data (a current candidate motion field) is available from the reference frame motion field data, obtaining current candidate motion field data (at 1322) from the reference frame motion field data. The current candidate motion field data includes motion vectors for inter coded blocks of a reference frame that are temporally directionally aligned. Obtaining the current candidate motion field data may include obtaining the current candidate motion field data in first-in-first-out order with respect to the reference frame motion field data. In some implementations, determining whether unevaluated candidate motion field data is available from the reference frame motion field data (at 1320), and obtaining current candidate motion field data may be omitted, and the motion vectors from the reference frame motion field data may be evaluated on a per-motion vector basis.

Obtaining motion trajectory data 1300 includes determining (at 1330) whether an unevaluated candidate motion vector is available from the current candidate motion field data. Prior to evaluating a respective candidate motion vector, the respective candidate motion vector is an unevaluated candidate motion vector. Subsequent to evaluating a respective candidate motion vector, the respective candidate motion vector is an evaluated candidate motion vector. The candidate motion vectors from the current candidate motion field data may be evaluated, or processed, on a per-motion vector basis, such as iteratively, or using parallel processing.

Obtaining motion trajectory data 1300 includes, in response to determining (at 1330) that an unevaluated candidate motion vector (current candidate motion vector data) is available from the current candidate motion field data, obtaining the unevaluated candidate motion vector (unevaluated candidate motion vector data) as a current reference motion vector (at 1332). The current reference motion vector data indicates a first block ($blk_0$) in a first reference frame ($f_{ref0}$) corresponding to the current candidate motion field data. The current reference motion vector (MV) data indicates a second reference frame ($f_{ref1}$) used for predicting the first block ($blk_0$).

Obtaining motion trajectory data 1300 includes, in response to determining (at 1330) that an unevaluated candidate motion vector is absent, or unavailable, from the current candidate motion field data, determining whether unevaluated candidate motion field data is available from the reference frame motion field data (at 1320).

Obtaining motion trajectory data 1300 includes determining whether to connect the current reference motion vector with a previously identified trajectory (at 1340). Determining whether to connect the current reference motion vector with a previously identified trajectory (at 1340) includes determining whether an endpoint of the current reference motion vector (MV) intersects with a previously identified trajectory (previously identified trajectory data), and, in response to determining that an endpoint of the current reference motion vector (MV) intersects with a previously identified trajectory, connecting the current reference motion vector (MV) to the trajectory. The motion vectors may have a defined precision, such as one eighth ($\frac{1}{8}$) pixel precision.

Determining whether to connect the current reference motion vector with a previously identified trajectory (at 1340) includes obtaining a second block ($blk_1$) in the second reference frame ($f_{ref1}$) indicated by projecting the current reference motion vector (MV) from the first block ($blk_0$) in the first reference frame ($f_{ref0}$), which may be expressed as the following:

$$blk_1 \leftarrow \text{project}(blk_0, MV).$$

Determining whether to connect the current reference motion vector with a previously identified trajectory (at 1340) includes determining whether first trajectory mapping data (blkIdMap) for the first reference frame ($f_{ref0}$) and the first block ($blk_0$) is greater than or equal to zero. The first trajectory mapping data (blkIdMap) may be an array. Determining whether first trajectory mapping data (blkIdMap) for the first reference frame ($f_{ref0}$) and the first block ($blk_0$) is greater than or equal to zero may be expressed as the following:

$$\text{if } blkIdMap[f_{ref0}][blk_0] \geq 0.$$

For a respective block location in a reference frame, the first trajectory mapping data (blkIdMap) stores, or includes, intersection, or corresponding, trajectory identifiers. The respective block locations have a defined block size, such as 8×8.

Determining whether to connect the current reference motion vector with a previously identified trajectory (at 1340) includes, in response to determining that the first trajectory mapping data (blkIdMap) for the first reference frame ($f_{ref0}$) and the first block ($blk_0$) is greater than or equal to zero, obtaining a current trajectory identifier (trajId) from the first trajectory mapping data (blkIdMap) for the first reference frame ($f_{ref0}$) and the first block ($blk_0$), which may be expressed as the following:

$$trajId \leftarrow blkIdMap[f_{ref0}][blk_0].$$

The current trajectory identifier (trajId) is an identifier of a trajectory and corresponds to a location of a block ($blk_{cur}$) in the current frame ($f_{cur}$) corresponding to, or intersecting with, the trajectory.

Determining whether to connect the current reference motion vector with a previously identified trajectory (at 1340) includes, in response to determining that the first trajectory mapping data (blkIdMap) for the first reference frame ($f_{ref0}$) and the first block ($blk_0$) is greater than or equal to zero, determining whether second trajectory mapping data (idOffsetMap) for the second reference frame ($f_{ref1}$) and the current trajectory identifier (trajId) is invalid, such as absent or unavailable. The second trajectory mapping data (idOffsetMap) may be an array obtained for coding the current frame. Determining whether second trajectory mapping data (idOffsetMap) for the second reference frame ($f_{ref1}$) and the current trajectory identifier (trajId) is invalid may be expressed as the following:

if idOffsetMap[$f_{ref1}$][trajId] is invalid.

For a respective trajectory identifier, the second trajectory mapping data (idOffsetMap) stores, or includes, respective locations in respective reference frames that intersect with the trajectory, expressed as an offset from a corresponding block in the most recently decoded reference frame.

Determining whether to connect the current reference motion vector with a previously identified trajectory (at 1340) includes, in response to determining that the first trajectory mapping data (blkIdMap) for the first reference frame ($f_{ref0}$) and the first block ($blk_0$) is greater than or equal to zero and determining that the second trajectory mapping data (idOffsetMap) for the second reference frame ($f_{ref1}$) and the current trajectory identifier (trajId) is invalid, connecting the trajectory (at 1350).

Connecting the trajectory (at 1350) includes obtaining a second motion vector ($MV_0$) from the second trajectory mapping data (idOffsetMap) for the first reference frame ($f_{ref0}$) and the current trajectory identifier (trajId), which may be expressed as the following:

$$MV_0 \leftarrow idOffsetMap[f_{ref0}][trajId].$$

Connecting the trajectory (at 1350) includes storing, assigning, or including, a sum of the second motion vector ($MV_0$) and the current reference motion vector (MV) in the second trajectory mapping data (idOffsetMap) for the second reference frame ($f_{ref1}$) and the current trajectory identifier (trajId), which may be expressed as the following:

$$idOffsetMap[f_{ref1}][trajId] \leftarrow MV_0 + MV.$$

Connecting the trajectory (at 1350) includes storing, assigning, or including, the current trajectory identifier (trajId) in the first trajectory mapping data (blkIdMap) for the second reference frame ($f_{ref1}$) and the second block ($blk_1$) which may be expressed as the following:

$$blkIdMap[f_{ref1}][blk_1] \leftarrow trajId.$$

Determining whether to connect the current reference motion vector with a previously identified trajectory (at 1340) includes determining whether first trajectory mapping data (blkIdMap) for the second reference frame ($f_{ref1}$) and the second block ($blk_1$) is greater than or equal to zero. Determining whether the first trajectory mapping data (blkIdMap) for the second reference frame ($f_{ref1}$) and the second block ($blk_1$)) is greater than or equal to zero may be expressed as the following:

$$\text{if } blkIdMap[f_{ref1}][blk_1] \geq 0.$$

Determining whether to connect the current reference motion vector with a previously identified trajectory (at 1340) includes, in response to determining that the first trajectory mapping data (blkIdMap) for the second reference frame ($f_{ref1}$) and the second block (blk$_1$) is greater than or equal to zero, obtaining the current trajectory identifier (trajId) from the first trajectory mapping data (blkIdMap) for the second reference frame ($f_{ref1}$) and the second block (blk$_1$), which may be expressed as the following:

$$trajID \leftarrow blkIdMap[f_{ref1}][blk_1].$$

Determining whether to connect the current reference motion vector with a previously identified trajectory (at 1340) includes, in response to determining that the first trajectory mapping data (blkIdMap) for the second reference frame ($f_{ref1}$) and the second block (blk$_1$) is greater than or equal to zero, determining whether second trajectory mapping data (idOffsetMap) for the first reference frame ($f_{ref0}$) and the current trajectory identifier (trajId) is invalid, such as absent or unavailable. Determining whether second trajectory mapping data (idOffsetMap) for the first reference frame ($f_{ref0}$) and the current trajectory identifier (trajId) is invalid may be expressed as the following:

if idOffsetMap[$f_{ref0}$][trajId] is invalid.

Determining whether to connect the current reference motion vector with a previously identified trajectory (at 1340) includes, in response to determining that the first trajectory mapping data (blkIdMap) for the second reference frame ($f_{ref1}$) and the second block (blk$_1$) is greater than or equal to zero and determining that the second trajectory mapping data (idOffsetMap) for the first reference frame ($f_{ref0}$) and the current trajectory identifier (trajId) is invalid, connecting the trajectory (at 1350).

Connecting the trajectory (at 1350) includes obtaining a third motion vector (MV$_1$) from the second trajectory mapping data (idOffsetMap) for the second reference frame ($f_{ref1}$) and the current trajectory identifier (trajId), which may be expressed as the following:

$$MV_1 \leftarrow idOffsetMap[f_{ref1}][trajId].$$

Connecting the trajectory (at 1350) includes storing, assigning, or including, a sum of the third motion vector (MV$_1$) and the current reference motion vector (MV) in the second trajectory mapping data (idOffsetMap) for the first reference frame ($f_{ref0}$) and the current trajectory identifier (trajId), which may be expressed as the following:

$$idOffsetMap[f_{ref0}][trajId] \leftarrow MV_1 + MV.$$

Connecting the trajectory (at 1350) includes storing, assigning, or including, the current trajectory identifier (trajId) in the first trajectory mapping data (blkIdMap) for the first reference frame ($f_{ref0}$) and the first block (blk$_0$) which may be expressed as the following:

$$blkIdMap[f_{ref0}][blk_0] \leftarrow trajId.$$

Obtaining motion trajectory data 1300 includes temporal motion vector prediction (TMVP), which includes generating a motion field, or a portion thereof, for the current frame by linear projection, which includes linear projection of a reference motion vector from a reference frame to the current frame. The projected motion vector is stored, or included, in temporal motion vector prediction data (tplMvs), such as an array, associated with the current frame. Generating the motion field may include hole-filling, smoothing, or both. Hole-filling and smoothing may be omitted for the first trajectory mapping data (blkIdMap) and the second trajectory mapping data (idOffsetMap).

Obtaining motion trajectory data 1300 includes, subsequent to connecting the trajectory (at 1350) or in response to determining to omit connecting the current reference motion vector with a previously identified trajectory (no at 1340), determining whether to generate a trajectory (at 1360).

Determining whether to generate a trajectory (at 1360) includes obtaining the second block (blk$_1$) in the second reference frame ($f_{ref1}$) indicated by projecting the current reference motion vector (MV) from the first block (blk$_0$) in the first reference frame ($f_{ref0}$), which may be expressed as the following:

$$blk_1 \leftarrow project\ (blk_0, MV).$$

Determining whether to generate a trajectory (at 1360) includes obtaining a first reference motion vector (MV$_{ref0}$) by scaling, or resizing, the current reference motion vector (MV) in accordance with difference between a temporal distance between the second reference frame ($f_{ref1}$) and the first reference frame ($f_{ref0}$), and a temporal distance between the first reference frame ($f_{ref0}$) and the current frame ($f_{cur}$), which may be expressed as the following:

$$MV_{ref0} \leftarrow resize\ (MV, f_{ref1} - f_{ref0}, f_{ref0} - f_{cur}).$$

Obtaining the first reference motion vector (MV$_{ref0}$) may be similar to temporal motion vector prediction, except as is described herein or as is otherwise clear from context.

Determining whether to generate a trajectory (at 1360) includes obtaining a second reference motion vector (MV$_{ref1}$) by scaling, or resizing, the current reference motion vector (MV) in accordance with difference between a temporal distance between the second reference frame ($f_{ref1}$) and the first reference frame ($f_{ref0}$), and a temporal distance between the second reference frame ($f_{ref1}$) and the current frame ($f_{cur}$), which may be expressed as the following:

$$MV_{ref1} \leftarrow resize\ (MV, f_{ref1} - f_{ref0}, f_{ref1} - f_{cur}).$$

Determining whether to generate a trajectory (at 1360) includes obtaining a current block (blk$_{cur}$) in the current frame ($f_{cur}$) indicated by projecting an inverse (opposite direction or negative) of the first reference motion vector ($-MV_{ref0}$) from the first block (blk$_0$) in the first reference frame ($f_{ref0}$), which may be expressed as the following:

$$blk_{cur} \leftarrow project\ (blk_0, -MV_{ref0}).$$

Obtaining the current block ($blk_{cur}$) may be similar to temporal motion vector prediction, except as is described herein or as is otherwise clear from context.

Determining whether to generate a trajectory (at 1360) includes determining whether the temporal motion vector prediction data (tplMvs) for the current block ($blk_{cur}$) is invalid, such as absent or unavailable. Determining whether the temporal motion vector prediction data (tplMvs) for the current block ($blk_{cur}$) is invalid may be expressed as the following:

if tplMvs[$blk_{cur}$] is invalid.

Determining whether the temporal motion vector prediction data (tplMvs) for the current block ($blk_{cur}$) is invalid may be similar to temporal motion vector prediction, except as is described herein or as is otherwise clear from context.

Obtaining motion trajectory data 1300 includes, in response to determining that the temporal motion vector prediction data (tplMvs) for the current block ($blk_{cur}$) is invalid (at 1360), generating a trajectory (at 1370).

Generating the trajectory (at 1370) includes obtaining, storing, assigning, or including, as the temporal motion vector prediction data for the current block (tplMvs[$blk_{cur}$]), the inverse (opposite direction or negative) of the first reference motion vector ($-MV_{ref0}$), which may be expressed as the following:

$$tplMvs[blk_{cur}] \leftarrow -MV_{ref0}.$$

Obtaining, storing, assigning, or including, as the temporal motion vector prediction data for the current block (tplMvs[$blk_{cur}$]) may be similar to temporal motion vector prediction, except as is described herein or as is otherwise clear from context.

Generating the trajectory (at 1370) includes storing, assigning, or including, in the second trajectory mapping data (idOffsetMap) for the first reference frame ($f_{ref0}$) and the current block ($blk_{cur}$), the first reference motion vector ($MV_{ref0}$), which may be expressed as the following:

$$idOffsetMap[f_{ref0}][blk_{cur}] \leftarrow MV_{ref0}.$$

Generating the trajectory (at 1370) includes storing, assigning, or including, in the second trajectory mapping data (idOffsetMap) for the second reference frame ($f_{ref1}$) and the current block ($blk_{cur}$), the second reference motion vector ($MV_{ref1}$), which may be expressed as the following:

$$idOffsetMap[f_{ref1}][blk_{cur}] \leftarrow MV_{ref1}.$$

Generating the trajectory (at 1370) includes storing, assigning, or including, the current block ($blk_{cur}$) in the first trajectory mapping data (blkIdMap) for first reference frame ($f_{ref0}$) and the first block ($blk_0$), which may be expressed as the following:

$$blkIdMap[f_{ref0}][blk_0] \leftarrow blk_{cur}.$$

Generating the trajectory (at 1370) includes storing, assigning, or including, the current block ($blk_{cur}$) in the first trajectory mapping data (blkIdMap) for the second reference frame ($f_{ref1}$) and the second block ($blk_1$), which may be expressed as the following:

$$blkIdMap[f_{ref1}][blk] \leftarrow blk_{cur}.$$

Obtaining motion trajectory data 1300 includes generating the trajectory (at 1360).

Although shown sequentially, in some implementations, determining whether to connect the current reference motion vector with a previously identified trajectory (at 1340) and connecting the trajectory (at 1350) may be performed in parallel with determining whether to generate a trajectory (at 1360) and generating the trajectory (at 1370), wherein storing, assigning, or including, the current block ($blk_{cur}$) in the first trajectory mapping data (blkIdMap) for first reference frame ($f_{ref0}$) and the first block ($blk_0$) and storing, assigning, or including, the current block ($blk_{cur}$) in the first trajectory mapping data (blkIdMap) for the second reference frame ($f_{ref1}$) and the second block ($blk_1$) are performed subsequent to determining whether to connect the current reference motion vector with a previously identified trajectory (at 1340) and connecting the trajectory (at 1350).

Obtaining motion trajectory data 1300 includes, subsequent to generating the trajectory (at 1360), determining (at 1330) whether an unevaluated candidate motion vector is available from the current candidate motion field data.

Although not shown in FIG. 13, in some implementations, obtaining motion trajectory data 1300 includes curve fitting, which may be similar to the curve fitting shown (at 1280) in FIG. 12, except as is described herein or as is otherwise clear from context. In some implementations, curve fitting may be omitted, skipped, excluded, or avoided.

For a block (B) in the current frame, a corresponding motion vector prediction (MVP) may be obtained from the second trajectory mapping data (idOffsetMap) for a reference frame (ref) and the block (B), which may be expressed as the following:

$$MVP = idOffsetMap[ref][B].$$

In some implementations, the second trajectory mapping data (idOffsetMap) for the reference frame (ref) and the block (B) may be invalid, such as absent or unavailable, and the motion vector prediction for the block (B) may be obtained from the temporal motion vector prediction data for the block (tplMvs[B]).

FIG. 14 is a flow diagram of an example of reference frame motion fields 1400 for coding a current frame in accordance with implementations of this disclosure. Obtaining reference frame motion fields 1400 may be implemented in an encoder, such as the encoder 400 shown in FIG. 4, a decoder, such as the decoder 500 shown in FIG. 5, or both. Obtaining reference frame motion fields 1400 is similar to obtaining reference frame motion fields as shown in FIG. 13 (at 1310).

Obtaining reference frame motion fields 1400 for coding a current frame includes obtaining one or more previously reconstructed reference frames (at 1410). The previously reconstructed reference frames may include less than or equal to a defined maximum number, count, or cardinality (defined maximum cardinality), of previously reconstructed reference frames. For example, the previously reconstructed reference frames may include a number, count, or cardinality, of previously reconstructed reference frames in a range from a minimum of one previously reconstructed reference frames to a maximum of the defined maximum number, count, or cardinality, of previously reconstructed reference frames, such as seven (7) previously reconstructed reference frames.

The previously reconstructed reference frames may include one or more previously reconstructed reference frames sequentially preceding the current frame, such as in temporal, display, or frame index, order (backward reference frames). The previously reconstructed reference frames may include one or more previously reconstructed reference frames sequentially subsequent to the current frame, such as in temporal, display, or frame index, order (forward reference frames). The previously reconstructed reference frames may be indicated in one or more reference frame, or reference picture, lists, such as a first reference picture list (L0), a second reference picture list (L1), or both. In some implementations, the first reference picture list (L0) may be a backward prediction reference picture list, and the second reference picture list (L1) may be a forward prediction reference picture list.

A respective previously reconstructed reference frame includes zero or more intra coded blocks and zero or more inter coded blocks. The inter coded blocks may include a backward motion vector, a forward motion vector, or both. A backward motion vector of an inter coded block of a respective previously reconstructed reference frame indicates a previously reconstructed reference frame sequentially preceding the respective previously reconstructed reference frame, such as in temporal, display, or frame index, order. A forward motion vector of an inter coded block of a respective previously reconstructed reference frame indicates a previously reconstructed reference frame sequentially subsequent to the respective previously reconstructed reference frame, such as in temporal, display, or frame index, order. A respective previously reconstructed reference frame from the previously reconstructed reference frames is coded with respect to zero or more reference frames thereof.

The motion vectors of the blocks of a respective previously reconstructed reference frame form the motion field of the respective previously reconstructed reference frame. The motion vectors of the motion field of the respective previously reconstructed reference frame that are oriented, or pointed, in the direction of the current frame, relative to the respective previously reconstructed reference frame, in temporal, display, or frame index, order, may be referred to herein as the current-frame-oriented portion of the motion field of the respective previously reconstructed reference frame. The motion vectors of the motion field of the respective previously reconstructed reference frame that are oriented, or pointing, away from the current frame, relative to the respective previously reconstructed reference frame, in temporal, display, or frame index, order, may be referred to herein as the away-oriented portion of the motion field of the respective previously reconstructed reference frame.

As used herein, the terminology "distance," as used with respect to frames, indicates a difference in temporal, display, or frame index, order, between the frames.

Obtaining the reference frame motion fields (at 1400) includes determining whether temporal interpolated prediction (TIP) is enabled (at 1420).

Obtaining the reference frame motion fields (at 1400) includes, in response to a determination (at 1420) that temporal interpolated prediction is enabled, or otherwise on a condition that temporal interpolated prediction is enabled, determining (at 1430) whether a current cardinality of candidate reference motion fields in the reference frame motion fields ($\|$RFMF$\|$) is less than a first defined maximum number, count, or cardinality, such as three ($\|$RFMF$\|$<3).

Obtaining the reference frame motion fields (at 1400) includes, in response to a determination (at 1430) that the current cardinality of candidate reference motion fields in the reference frame motion fields ($\|$RFMF$\|$) is less than the first defined maximum number, count, or cardinality, ($\|$RFMF$\|$<3), obtaining (at 1432), as a more recently coded reference frame (more recent reference frame or MRRF), in coding order, among a sequentially, such as in temporal, display, or frame index, order closest, to the current frame, backward reference frame from the previously reconstructed reference frames and a sequentially, such as in temporal, display, or frame index, order, closest, to the current frame, forward reference frame from the previously reconstructed reference frames. Obtaining the reference frame motion fields (at 1400) identifying, from the previously reconstructed reference frames, the closest, to the current frame, backward reference frame, the closest, to the current frame, forward reference frame, or both.

Obtaining the reference frame motion fields (at 1400) includes obtaining a current-frame-oriented portion of a motion field of the more recently coded previously reconstructed reference frame (current-frame-oriented motion field portion of the more recent reference frame or MRRF-CFOMFP) and including (at 1432) the current-frame-oriented portion of a motion field of the more recently coded previously reconstructed reference frame in the reference frame motion fields as a candidate reference motion field (temporal interpolated prediction candidate reference motion field).

For example, the sequentially, such as in temporal, display, or frame index, order, closest backward reference frame from the previously reconstructed reference frames, relative to the current frame, may have been coded more recently, in coding order, than the sequentially, such as in temporal, display, or frame index, order, closest forward reference frame from the previously reconstructed reference frames, and the sequentially, such as in temporal, display, or frame index, order, closest backward reference frame from the previously reconstructed reference frames may be identified as the more recently coded previously reconstructed reference frame (at 1432). The forward motion vectors of the closest backward reference frame, relative to the current frame, from the previously reconstructed reference frames are current-frame-oriented. The forward motion vectors of the closest backward reference frame from the previously reconstructed reference frames are the current-frame-oriented portion of the motion field of the more recently coded previously reconstructed reference frame. The forward motion vectors of the closest backward reference frame from the previously reconstructed reference frames are identified as a candidate reference motion field for coding the current frame and included in the reference frame motion fields (at 1432). Obtaining the backward motion vectors of the closest backward reference frame from the previously reconstructed reference frames may be omitted, excluded, or avoided (at 1432).

In another example, the sequentially, such as in temporal, display, or frame index, order, closest forward reference frame from the previously reconstructed reference frames, relative to the current frame, may have been coded more recently, in coding order, than the sequentially, such as in temporal, display, or frame index, order, closest backward reference frame from the previously reconstructed reference frames, and the sequentially, such as in temporal, display, or frame index, order, closest forward reference frame from the previously reconstructed reference frames may be identified as the more recently coded previously reconstructed reference frame (at 1432). The backward motion vectors of the closest forward reference frame, relative to the current frame, from the previously reconstructed reference frames are current-frame-oriented. The backward motion vectors of the closest forward reference frame from the previously reconstructed reference frames are the current-frame-oriented portion of the motion field of the more recently coded previously reconstructed reference frame. The backward motion vectors of the closest forward reference frame from the previously reconstructed reference frames are identified as a candidate reference motion field for coding the current frame and included in the reference frame motion fields (at 1432). Obtaining the forward motion vectors of the closest forward reference frame from the previously reconstructed reference frames may be omitted, excluded, or avoided (at 1432).

In response to a determination that temporal interpolated prediction (TIP) is disabled (at 1420), determining (at 1430) whether the current cardinality of candidate reference motion fields in the reference frame motion fields is less than the first defined maximum number, count, or cardinality, and including the backward motion vectors of the closest forward reference frame in the reference frame motion fields (at 1432) may be omitted, excluded, or skipped.

Obtaining the reference frame motion fields (at 1400) includes, determining (at 1440) whether the current cardinality of candidate reference motion fields in the reference frame motion fields ($\|RFMF\|$) is less than the first defined maximum number, count, or cardinality, such as three ($\|RFMF\|<3$).

Obtaining the reference frame motion fields (at 1400) includes, in response to a determination (at 1440) that the current cardinality of candidate reference motion fields in the reference frame motion fields ($\|RFMF\|$) is less than the first defined maximum number, count, or cardinality, ($\|RFMF\|<3$), obtaining (at 1442), from among the closest backward reference frame from the previously reconstructed reference frames and the closest forward reference frame from the previously reconstructed reference frames, as a minimal reference distance closest reference frame (MRDCRF), the previously reconstructed reference frame having a minimal distance among distances, from the previously reconstructed reference frame, of the reference frames thereof.

For example, among the reference frames of the closest backward reference frame, the minimal distance from the closest backward reference frame may be one (1), among the reference frames of the closest forward reference frame, the minimal distance from the closest reference frame may be two (2), the closest backward reference frame from the previously reconstructed reference frames may be identified as having the minimal distance, and the closest backward reference frame from the previously reconstructed reference frames may be identified as the minimal reference distance closest reference frame (at 1442).

Obtaining the reference frame motion fields (at 1400) includes obtaining the current-frame-oriented portion of the motion field of the minimal reference distance closest reference frame (current-frame-oriented motion field portion of the minimal reference distance closest reference frame or MRDCRF-CFOMFP) and including the current-frame-oriented motion field portion of the minimal reference distance closest reference frame in the reference frame motion fields as a candidate reference motion field (at 1442).

Obtaining the reference frame motion fields (at 1400) includes, determining (at 1444) whether the current cardinality of candidate reference motion fields in the reference frame motion fields ($\|RFMF\|$) is less than the first defined maximum number, count, or cardinality, such as three ($\|RFMF\|<3$).

Obtaining the reference frame motion fields (at 1400) includes, in response to a determination (at 1444) that the current cardinality of candidate reference motion fields in the reference frame motion fields ($\|RFMF\|$) is less than the first defined maximum number, count, or cardinality, ($\|RFMF\|<3$), identifying (at 1446), as a next-minimal reference distance closest reference frame (NMRDCRF), a reference frame, other than the minimal reference distance closest reference frame, among the closest backward reference frame from the previously reconstructed reference frames and the closest forward reference frame from the previously reconstructed reference frames.

Obtaining the reference frame motion fields (at 1400) includes obtaining (at 1446) the current-frame-oriented portion of the motion field of the next-minimal reference distance closest reference frame (current-frame-oriented motion field portion of the next-minimal reference distance closest reference frame or NMRDCRF-CFOMFP) and including the current-frame-oriented motion field portion of the next-minimal reference distance closest reference frame in the reference frame motion fields as a candidate reference motion field (at 1446).

Obtaining the reference frame motion fields (at 1400) includes, determining (at 1450) whether the current cardinality of candidate reference motion fields in the reference frame motion fields ($\|RFMF\|$) is less than the first defined maximum number, count, or cardinality, such as three ($\|RFMF\|<3$).

Obtaining the reference frame motion fields (at 1400) includes, in response to a determination (at 1450) that the current cardinality of candidate reference motion fields in the reference frame motion fields ($\|RFMF\|$) is less than the first defined maximum number, count, or cardinality, ($\|RFMF\|<3$), identifying (at 1452) a sequentially, such as in temporal, display, or frame index, order, next-closest backward reference frame (NCBRF) from the previously reconstructed reference frames, wherein the next-closest backward reference frame from the previously reconstructed reference frames is the backward reference frame from the previously reconstructed reference frames that is closest, such as in temporal, display, or frame index, order, to the current frame other than the closest backward reference frame from the previously reconstructed reference frames.

Obtaining the reference frame motion fields (at 1400) includes identifying (at 1452) a sequentially, such as in temporal, display, or frame index, order, next-closest forward reference frame (NCFRF) from the previously reconstructed reference frames, wherein the next-closest forward reference frame from the previously reconstructed reference frames is the forward reference frame from the previously reconstructed reference frames that is closest, such as in temporal, display, or frame index, order, to the current frame other than the closest forward reference frame from the previously reconstructed reference frames.

Obtaining the reference frame motion fields (at 1400) includes identifying (at 1452), from among the next-closest backward reference frame and the next-closest forward reference frame, as a minimal reference distance next-closest reference frame (MRDNCRF), the previously reconstructed reference frame having a minimal distance among distances, from the previously reconstructed reference frame, of the reference frames thereof.

Obtaining the reference frame motion fields (at 1400) includes obtaining the current-frame-oriented portion of the motion field of the minimal reference distance next-closest reference frame (current-frame-oriented motion field portion of the minimal reference distance next-closest reference frame or MRDNCRF-CFOMFP) and including the current-frame-oriented motion field portion of the minimal reference distance next-closest reference frame in the reference frame motion fields as a candidate reference motion field (at 1452).

Obtaining the reference frame motion fields (at 1400) includes, determining (at 1454) whether the current cardinality of candidate reference motion fields in the reference frame motion fields (∥RFMF∥) is less than the first defined maximum number, count, or cardinality, such as three (∥RFMF∥<3).

Obtaining the reference frame motion fields (at 1400) includes, in response to a determination (at 1454) that the current cardinality of candidate reference motion fields in the reference frame motion fields (∥RFMF∥) is less than the first defined maximum number, count, or cardinality, (∥RFMF∥<3), identifying (at 1456), as a next-minimal reference distance next-closest reference frame (NMRDN-CRF), a reference frame, other than the minimal reference distance next-closest reference frame, among the next-closest backward reference frame and the next-closest forward reference frame.

Obtaining the reference frame motion fields (at 1400) includes obtaining (at 1456) the current-frame-oriented portion of the motion field of the next-minimal reference distance next-closest reference frame (current-frame-oriented motion field portion of the next-minimal reference distance next-closest reference frame or NMRDNCRF-CFOMFP) and including the current-frame-oriented motion field portion of the next-minimal reference distance next-closest reference frame in the reference frame motion fields as a candidate reference motion field (at 1456).

Obtaining the reference frame motion fields (at 1400) includes, determining (at 1460) whether the current cardinality of candidate reference motion fields in the reference frame motion fields (∥RFMF∥) is less than the first defined maximum number, count, or cardinality, such as three (∥RFMF∥<3).

Obtaining the reference frame motion fields (at 1400) includes, in response to a determination (at 1460) that the current cardinality of candidate reference motion fields in the reference frame motion fields (∥RFMF∥) is less than the first defined maximum number, count, or cardinality, (∥RFMF∥<3), obtaining (at 1462) the portion of the motion field, of the closest, with respect to the current frame, backward reference frame from the previously reconstructed reference frames, oriented, or pointing, away from the current frame (away-oriented motion field portion of the closest backward reference frame or CBRF-AOMFP), and including the away-oriented motion field portion of the closest backward reference frame in the reference frame motion fields as a candidate reference motion field (at 1462).

Obtaining the reference frame motion fields (at 1400) includes, determining (at 1464) whether the current cardinality of candidate reference motion fields in the reference frame motion fields (∥RFMF∥) is less than the first defined maximum number, count, or cardinality, such as three (∥RFMF∥<3).

Obtaining the reference frame motion fields (at 1400) includes, in response to a determination (at 1464) that the current cardinality of candidate reference motion fields in the reference frame motion fields (∥RFMF∥) is less than the first defined maximum number, count, or cardinality, (∥RFMF∥<3), obtaining (at 1466) the portion of the motion field, of the next-closest, with respect to the current frame, backward reference frame from the previously reconstructed reference frames, oriented, or pointing, away from the current frame (away-oriented motion field portion of the next-closest backward reference frame or NCBRF-AOMFP), and including the away-oriented motion field portion of the next-closest backward reference frame in the reference frame motion fields as a candidate reference motion field (at 1466).

In response to a determination (at 1430) that the current cardinality of candidate reference motion fields in the reference frame motion fields is greater than or equal to the first defined maximum number, count, or cardinality, including the backward motion vectors of the closest forward reference frame in the reference frame motion fields (at 1432), determining (at 1440) whether the current cardinality of candidate reference motion fields in the reference frame motion fields is less than the first defined maximum number, count, or cardinality, including the current-frame-oriented motion field portion of the minimal reference distance closest reference frame in the reference frame motion fields as a candidate reference motion field (at 1442), determining (at 1444) whether the current cardinality of candidate reference motion fields in the reference frame motion fields is less than the first defined maximum number, count, or cardinality, including the current-frame-oriented motion field portion of the next-minimal reference distance closest reference frame in the reference frame motion fields as a candidate reference motion field (at 1446), determining (at 1450) whether the current cardinality of candidate reference motion fields in the reference frame motion fields is less than the first defined maximum number, count, or cardinality, including the current-frame-oriented motion field portion of the minimal reference distance next-closest reference frame in the reference frame motion fields as a candidate reference motion field (at 1452), determining (at 1454) whether the current cardinality of candidate reference motion fields in the reference frame motion fields is less than the first defined maximum number, count, or cardinality, including the current-frame-oriented motion field portion of the next-minimal reference distance next-closest reference frame in the reference frame motion fields as a candidate reference motion field (at 1456), determining (at 1460) whether the current cardinality of candidate reference motion fields in the reference frame motion fields is less than the first defined maximum number, count, or cardinality, including the away-oriented motion field portion of the closest backward reference frame in the reference frame motion fields as a candidate reference motion field (at 1462), determining (at 1464) whether the current cardinality of candidate reference motion fields in the reference frame motion fields is less than the first defined maximum number, count, or cardinality, and including the away-oriented motion field portion of the next-closest backward reference frame in the reference frame motion fields as a candidate reference motion field (at 1466) may be omitted, excluded, or skipped.

In response to a determination (at 1440) that the current cardinality of candidate reference motion fields in the reference frame motion fields is greater than or equal to the first defined maximum number, count, or cardinality, including the current-frame-oriented motion field portion of the minimal reference distance closest reference frame in the reference frame motion fields as a candidate reference motion field (at 1442), determining (at 1444) whether the current cardinality of candidate reference motion fields in the reference frame motion fields is less than the first defined maximum number, count, or cardinality, including the current-frame-oriented motion field portion of the next-minimal reference distance closest reference frame in the reference frame motion fields as a candidate reference motion field (at 1446), determining (at 1450) whether the current cardinality of candidate reference motion fields in the reference frame motion fields is less than the first defined maximum number, count, or cardinality, including the current-frame-oriented motion field portion of the minimal reference distance next-closest reference frame in the reference frame motion fields as a candidate reference motion field (at 1452), determining (at 1454) whether the current cardinality of candidate reference motion fields in the reference frame motion fields is less than the first defined maximum number, count, or cardinality, including the current-frame-oriented motion field portion of the next-minimal reference distance next-closest reference frame in the reference frame motion fields as a candidate reference motion field (at 1456), determining (at 1460) whether the current cardinality of candidate reference motion fields in the reference frame motion fields is less than the first defined maximum number, count, or cardinality, including the away-oriented motion field portion of the closest backward reference frame in the reference frame motion fields as a candidate reference motion field (at 1462), determining (at 1464) whether the current cardinality of candidate reference motion fields in the reference frame motion fields is less than the first defined maximum number, count, or cardinality, and including the away-oriented motion field portion of the next-closest backward reference frame in the reference frame motion fields as a candidate reference motion field (at 1466) may be omitted, excluded, or skipped.

In response to a determination (at 1444) that the current cardinality of candidate reference motion fields in the reference frame motion fields is greater than or equal to the first defined maximum number, count, or cardinality, including the current-frame-oriented motion field portion of the next-minimal reference distance closest reference frame in the reference frame motion fields as a candidate reference motion field (at 1446), determining (at 1450) whether the current cardinality of candidate reference motion fields in the reference frame motion fields is less than the first defined maximum number, count, or cardinality, including the current-frame-oriented motion field portion of the minimal reference distance next-closest reference frame in the reference frame motion fields as a candidate reference motion field (at 1452), determining (at 1454) whether the current cardinality of candidate reference motion fields in the reference frame motion fields is less than the first defined maximum number, count, or cardinality, including the current-frame-oriented motion field portion of the next-minimal reference distance next-closest reference frame in the reference frame motion fields as a candidate reference motion field (at 1456), determining (at 1460) whether the current cardinality of candidate reference motion fields in the reference frame motion fields is less than the first defined maximum number, count, or cardinality, including the away-oriented motion field portion of the closest backward reference frame in the reference frame motion fields as a candidate reference motion field (at 1462), determining (at 1464) whether the current cardinality of candidate reference motion fields in the reference frame motion fields is less than the first defined maximum number, count, or cardinality, and including the away-oriented motion field portion of the next-closest backward reference frame in the reference frame motion fields as a candidate reference motion field (at 1466) may be omitted, excluded, or skipped.

next-closest backward reference frame in the reference frame motion fields as a candidate reference motion field (at 1466) may be omitted, excluded, or skipped.

In response to a determination (at 1450) that the current cardinality of candidate reference motion fields in the reference frame motion fields is greater than or equal to the first defined maximum number, count, or cardinality, including the current-frame-oriented motion field portion of the minimal reference distance next-closest reference frame in the reference frame motion fields as a candidate reference motion field (at 1452), determining (at 1454) whether the current cardinality of candidate reference motion fields in the reference frame motion fields is less than the first defined maximum number, count, or cardinality, including the current-frame-oriented motion field portion of the next-minimal reference distance next-closest reference frame in the reference frame motion fields as a candidate reference motion field (at 1456), determining (at 1460) whether the current cardinality of candidate reference motion fields in the reference frame motion fields is less than the first defined maximum number, count, or cardinality, including the away-oriented motion field portion of the closest backward reference frame in the reference frame motion fields as a candidate reference motion field (at 1462), determining (at 1464) whether the current cardinality of candidate reference motion fields in the reference frame motion fields is less than the first defined maximum number, count, or cardinality, and including the away-oriented motion field portion of the next-closest backward reference frame in the reference frame motion fields as a candidate reference motion field (at 1466) may be omitted, excluded, or skipped.

In response to a determination (at 1454) that the current cardinality of candidate reference motion fields in the reference frame motion fields is greater than or equal to the first defined maximum number, count, or cardinality, including the current-frame-oriented motion field portion of the next-minimal reference distance next-closest reference frame in the reference frame motion fields as a candidate reference motion field (at 1456), determining (at 1460) whether the current cardinality of candidate reference motion fields in the reference frame motion fields is less than the first defined maximum number, count, or cardinality, including the away-oriented motion field portion of the closest backward reference frame in the reference frame motion fields as a candidate reference motion field (at 1462), determining (at 1464) whether the current cardinality of candidate reference motion fields in the reference frame motion fields is less than the first defined maximum number, count, or cardinality, and including the away-oriented motion field portion of the next-closest backward reference frame in the reference frame motion fields as a candidate reference motion field (at 1466) may be omitted, excluded, or skipped.

In response to a determination (at 1460) that the current cardinality of candidate reference motion fields in the reference frame motion fields is greater than or equal to the first defined maximum number, count, or cardinality, including the away-oriented motion field portion of the closest backward reference frame in the reference frame motion fields as a candidate reference motion field (at 1462), determining (at 1464) whether the current cardinality of candidate reference motion fields in the reference frame motion fields is less than the first defined maximum number, count, or cardinality, and including the away-oriented motion field portion of the next-closest backward reference frame in the reference frame motion fields as a candidate reference motion field (at 1466) may be omitted, excluded, or skipped.

In response to a determination (at 1464) that the current cardinality of candidate reference motion fields in the reference frame motion fields is greater than or equal to the first defined maximum number, count, or cardinality, including the away-oriented motion field portion of the next-closest backward reference frame in the reference frame motion fields as a candidate reference motion field (at 1466) may be omitted, excluded, or skipped.

Obtaining the reference frame motion fields (at 1400) includes evaluating, such as iteratively, the previously reconstructed reference frames in increasing coding recency order, from the most recently coded reference frame to the least recently coded reference frame. For example, the most recently coded reference frame from the previously reconstructed reference frames has the lowest coding recency order and is evaluated prior to evaluating the reference frame from the previously reconstructed reference frames having the next lowest coding recency order.

Evaluating the previously reconstructed reference frames in increasing coding recency order includes determining (at 1470) whether the number, count, or cardinality of candidate reference motion fields available in the reference frame motion fields is less than a second defined maximum number, count, or cardinality, such as six (6), of candidate reference motion fields. In some implementations, other values of the defined maximum number, count, or cardinality, of candidate reference motion fields may be used. In some implementations, the maximum number, count, or cardinality, of candidate reference motion fields may be the number, count, or cardinality, of available motion fields. For example, seven reference frames may be available, corresponding to fourteen available motion fields.

Evaluating the previously reconstructed reference frames in increasing coding recency order includes, in response to a determination (at 1470) that the number, count, or cardinality of candidate reference motion fields available in the reference frame motion fields is less than the second defined maximum number, count, or cardinality of candidate reference motion fields, determining (at 1472) whether a next most recently coded reference frame (NMRCRF) is available from the previously reconstructed reference frames. In a first iteration, the next most recently coded reference frame is the most recently coded reference frame. In iterations subsequent to the first iteration, the next most recently coded reference frame is the most recently coded reference frame coded subsequent to coding the next most recently coded reference frame from the previous iteration.

Evaluating the previously reconstructed reference frames in increasing coding recency order includes, in response to a determination (at 1472) that the next most recently coded reference frame is available, determining (at 1474) whether a candidate reference motion field corresponding to a current-frame-oriented motion field portion of the next most recently coded reference frame (NMRCRF-CFOMFP) is available from the reference frame motion fields.

In response to determining (at 1474) that the candidate reference motion field corresponding to the current-frame-oriented motion field portion of the next most recently coded reference frame (NMRCRF-CFOMFP) is absent, or unavailable, from the reference frame motion fields, obtaining (at 1476) the current-frame-oriented motion field portion of the next most recently coded reference frame (NMRCRF-CFO-MFP) and including (at 1476) the current-frame-oriented motion field portion of the next most recently coded reference frame (NMRCRF-CFOMFP) in the reference frame motion fields as a candidate reference motion field.

In response to determining (at 1474) that the candidate reference motion field corresponding to the current-frame-oriented motion field portion of the next most recently coded reference frame (NMRCRF-CFOMFP) is available from the reference frame motion fields, obtaining (at 1478) the away-oriented motion field portion of the next most recently coded reference frame (NMRCRF-AOMFP) and including (at 1478) the away-oriented motion field portion of the next most recently coded reference frame (NMRCRF-AOMFP) in the reference frame motion fields as a candidate reference motion field.

In response to determining (at 1470) that the number, count, or cardinality of candidate reference motion fields available in the reference frame motion fields is greater than or equal to the second defined maximum number, count, or cardinality, such as six (6), of candidate reference motion fields, evaluating the previously reconstructed reference frames in increasing coding recency order is otherwise omitted, skipped, or excluded.

In response to determining (at 1472) that the next most recently coded reference frame is unavailable from the previously reconstructed reference frames, evaluating the previously reconstructed reference frames in increasing coding recency order is otherwise omitted, skipped, or excluded.

As used herein, the terms "optimal", "optimized", "optimization", or other forms thereof, are relative to a respective context and are not indicative of absolute theoretic optimization unless expressly specified herein.

As used herein, the term "set" indicates a distinguishable collection or grouping of zero or more distinct elements or members that may be represented as a one-dimensional array or vector, except as expressly described herein or otherwise clear from context.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein.

Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition, or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

It will be appreciated that aspects can be implemented in any convenient form. For example, aspects may be implemented by appropriate computer programs which may be carried on appropriate carrier media which may be tangible carrier media (e.g., disks) or intangible carrier media (e.g. communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:

generating reconstructed video data by decoding an encoded bitstream, wherein decoding the encoded bitstream includes:

obtaining, from previously reconstructed reference frames available for reconstructing a current frame, reference frame motion fields data for reconstructing the current frame;

obtaining, using the reference frame motion fields data, trajectory mapping data for reconstructing the current frame;

accessing, from the encoded bitstream, current encoded block data for a current block of the current frame;

obtaining a motion vector prediction for the current block in accordance with the trajectory mapping data;

obtaining a differential motion vector from the current encoded block data;

obtaining a motion vector for the current block by adding the motion vector prediction and the differential motion vector;

decoding the current block using the motion vector to obtain decoded block data for the current block;

obtaining reconstructed frame data for the current frame using the decoded block data; and including the reconstructed frame data in the reconstructed video data; and outputting the reconstructed video data.

2. The method of claim 1, wherein obtaining the reference frame motion fields data includes:

including, in the reference frame motion fields data, less than or equal to a first defined maximum cardinality of candidate reference motion fields; and for the previously reconstructed reference frames:

determining whether a current cardinality of candidate reference motion fields in the reference frame motion fields data is less than a second defined maximum cardinality; and in response to determining that the current cardinality of candidate reference motion fields in the reference frame motion fields data is less than the second defined maximum cardinality:

obtaining, in coding recency order, a next most recently coded reference frame; and determining whether the reference frame motion fields data includes a first portion of a motion field of the next most recently coded reference frame that is oriented toward the current frame.

3. The method of claim 2, wherein obtaining the reference frame motion fields data includes:

in response to determining that the reference frame motion fields data omits the first portion of the motion field of the next most recently coded reference frame that is oriented toward the current frame, including the first portion of the motion field of the next most recently coded reference frame in the reference frame motion fields data as a candidate reference motion field.

4. The method of claim 2, wherein obtaining the reference frame motion fields data includes:

in response to determining that the reference frame motion fields data includes the first portion of the motion field of the next most recently coded reference frame that is oriented toward the current frame:

obtaining a portion of the motion field of the next most recently coded reference frame that is oriented away from the current frame; and including the portion of the motion field of the next most recently coded reference frame that is oriented away from the current frame in the reference frame motion fields data as a candidate reference motion field.

5. The method of claim 1, wherein obtaining the trajectory mapping data includes:

obtaining a current reference motion vector from the reference frame motion fields data;

determining whether to connect the current reference motion vector to previously identified trajectory data for reconstructing the current frame; and in response to determining to connect the current reference motion vector to the previously identified trajectory data, connecting the current reference motion vector to the previously identified trajectory data in trajectory mapping data for reconstructing the current frame.

6. The method of claim 5, wherein determining whether to connect the current reference motion vector to previously identified trajectory data for reconstructing the current frame includes:

in response to determining that an endpoint of the current reference motion vector intersects with a previously identified trajectory from the previously identified trajectory data, connecting the current reference motion vector to the previously identified trajectory.

7. The method of claim 5, wherein obtaining the trajectory mapping data includes:

determining whether to generate trajectory data for reconstructing the current frame in accordance with the current reference motion vector;

in response to determining to generate the trajectory data:

generating the trajectory data for reconstructing the current frame in accordance with the current reference motion vector; and including the trajectory data in trajectory mapping data for reconstructing the current frame.

8. An apparatus comprising:

a non-transitory computer-readable medium; and a processor configured to execute instructions stored on the non-transitory computer-readable medium to:

generate reconstructed video data, wherein, to generate the reconstructed video data, the processor executes the instructions to decode an encoded bitstream, wherein, to decode the encoded bitstream, the processor executes the instructions to:

obtain, from previously reconstructed reference frames available for reconstructing a current frame, reference frame motion fields data for reconstructing the current frame;

obtaining, using the reference frame motion fields data, trajectory mapping data for reconstructing the current frame;

access, from the encoded bitstream, current encoded block data for a current block of the current frame;

obtain a motion vector prediction for the current block in accordance with the trajectory mapping data;

obtain a differential motion vector from the current encoded block data;

obtain, as a motion vector for the current block, a sum of the motion vector prediction and the differential motion vector;

decode the current block in accordance with the motion vector to obtain decoded block data for the current block;

obtain reconstructed frame data for the current frame in accordance with the decoded block data; and include the reconstructed frame data in the reconstructed video data; and output the reconstructed video data.

9. The apparatus of claim 8, wherein, to obtain the reference frame motion fields data, the processor executes the instructions to:

include, in the reference frame motion fields data, less than or equal to a first defined maximum cardinality of candidate reference motion fields; and for the previously reconstructed reference frames:

determine whether a current cardinality of candidate reference motion fields in the reference frame motion fields data is less than a second defined maximum cardinality; and in response to a determination that the current cardinality of candidate reference motion fields in the reference frame motion fields data is less than the second defined maximum cardinality:

obtain, in coding recency order, a next most recently coded reference frame; and determine whether the reference frame motion fields data includes a first portion of a motion field of the next most recently coded reference frame that is oriented toward the current frame.

10. The apparatus of claim 9, wherein, to obtain the reference frame motion fields data, the processor executes the instructions to:

in response to a determination that the reference frame motion fields data omits the first portion of the motion field of the next most recently coded reference frame that is oriented toward the current frame, include the first portion of the motion field of the next most recently coded reference frame in the reference frame motion fields data as a candidate reference motion field.

11. The apparatus of claim 9, wherein, to obtain the reference frame motion fields data, the processor executes the instructions to:

in response to a determination that the reference frame motion fields data includes the first portion of the motion field of the next most recently coded reference frame that is oriented toward the current frame:

obtain a portion of the motion field of the next most recently coded reference frame that is oriented away from the current frame; and include the portion of the motion field of the next most recently coded reference frame that is oriented away from the current frame in the reference frame motion fields data as a candidate reference motion field.

12. The apparatus of claim 8, wherein, to obtain the trajectory mapping data, the processor executes the instructions to:

obtain a current reference motion vector from the reference frame motion fields data;

determine whether to connect the current reference motion vector to previously identified trajectory data for reconstructing the current frame; and in response to a determination to connect the current reference motion vector to the previously identified trajectory data, connect the current reference motion vector to the previously identified trajectory data in trajectory mapping data for reconstructing the current frame.

13. The apparatus of claim 12, wherein, to determine whether to connect the current reference motion vector to previously identified trajectory data for reconstructing the current frame, the processor executes the instructions to:

in response to a determination that an endpoint of the current reference motion vector intersects with a previously identified trajectory from the previously identified trajectory data, connect the current reference motion vector to the previously identified trajectory.

14. The apparatus of claim 12, wherein, to obtain the trajectory mapping data, the processor executes the instructions to:

determine whether to generate trajectory data for reconstructing the current frame in accordance with the current reference motion vector; and in response to a determination to generate the trajectory data:

generate the trajectory data for reconstructing the current frame in accordance with the current reference motion vector; and include the trajectory data in trajectory mapping data for reconstructing the current frame.

15. A method comprising:

generating an encoded bitstream by encoding a current frame from an input video stream, wherein encoding the current frame includes:

obtaining, from previously reconstructed reference frames available for encoding the current frame, reference frame motion fields data for encoding the current frame;

obtaining, using the reference frame motion fields data, trajectory mapping data for encoding the current frame;

obtaining a motion vector prediction for a current block from the current frame in accordance with the trajectory mapping data;

obtaining current encoded block data by encoding a current block of the current frame using a current motion vector;

obtaining, as a differential motion vector, a result of subtracting the motion vector prediction from the current motion vector; and including, in the encoded bitstream, current encoded block data for the current block, wherein the current encoded block data for the current block includes the differential motion vector; and outputting the encoded bitstream.

16. The method of claim 15, wherein obtaining the reference frame motion fields data includes:

including, in the reference frame motion fields data, less than or equal to a first defined maximum cardinality of candidate reference motion fields; and for the previously reconstructed reference frames:

determining whether a current cardinality of candidate reference motion fields in the reference frame motion fields data is less than a second defined maximum cardinality; and in response to determining that the current cardinality of candidate reference motion fields in the reference frame motion fields data is less than the second defined maximum cardinality:

obtaining, in coding recency order, a next most recently coded reference frame; and determining whether the reference frame motion fields data includes a first portion of a motion field of the next most recently coded reference frame that is oriented toward the current frame.

17. The method of claim 16, wherein obtaining the reference frame motion fields data includes:

in response to determining that the reference frame motion fields data omits the first portion of the motion field of the next most recently coded reference frame that is oriented toward the current frame, including the first portion of the motion field of the next most recently coded reference frame in the reference frame motion fields data as a candidate reference motion field.

18. The method of claim 16, wherein obtaining the reference frame motion fields data includes:

in response to determining that the reference frame motion fields data includes the first portion of the motion field of the next most recently coded reference frame that is oriented toward the current frame:

obtaining a portion of the motion field of the next most recently coded reference frame that is oriented away from the current frame; and including the portion of the motion field of the next most recently coded reference frame that is oriented away from the current frame in the reference frame motion fields data as a candidate reference motion field.

19. The method of claim 15, wherein obtaining the trajectory mapping data includes:

obtaining a current reference motion vector from the reference frame motion fields data;

determining whether to connect the current reference motion vector to previously identified trajectory data for reconstructing the current frame;

in response to determining to connect the current reference motion vector to the previously identified trajectory data, connecting the current reference motion vector to the previously identified trajectory data in trajectory mapping data for reconstructing the current frame;

determining whether to generate trajectory data for reconstructing the current frame in accordance with the current reference motion vector; and in response to determining to generate the trajectory data:

generating the trajectory data for reconstructing the current frame in accordance with the current reference motion vector; and including the trajectory data in trajectory mapping data for reconstructing the current frame.

20. The method of claim 19, wherein determining whether to connect the current reference motion vector to previously identified trajectory data for reconstructing the current frame includes:

in response to determining that an endpoint of the current reference motion vector intersects with a previously identified trajectory from the previously identified trajectory data, connecting the current reference motion vector to the previously identified trajectory.

* * * * *